United States Patent
Kazmi et al.

(10) Patent No.: US 11,271,704 B2
(45) Date of Patent: Mar. 8, 2022

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/638,177

(22) PCT Filed: Aug. 13, 2018

(86) PCT No.: PCT/SE2018/050818
§ 371 (c)(1),
(2) Date: Feb. 11, 2020

(87) PCT Pub. No.: WO2019/032039
PCT Pub. Date: Feb. 14, 2019

(65) Prior Publication Data
US 2020/0366450 A1     Nov. 19, 2020

Related U.S. Application Data

(60) Provisional application No. 62/544,126, filed on Aug. 11, 2017.

(51) Int. Cl.
*H04L 5/00* (2006.01)
*H04W 76/00* (2018.01)
(Continued)

(52) U.S. Cl.
CPC ............ *H04L 5/0092* (2013.01); *H04L 5/005* (2013.01); *H04L 5/0098* (2013.01); *H04W 24/10* (2013.01); *H04W 76/28* (2018.02); *H04W 76/30* (2018.02)

(58) Field of Classification Search
None
See application file for complete search history.

(56) References Cited

U.S. PATENT DOCUMENTS

| 9,319,204 B2 | 4/2016 | Kazmi et al. |
| 2015/0009898 A1 | 1/2015 | Rosa et al. |

(Continued)

FOREIGN PATENT DOCUMENTS

| RU | 2523359 C2 | 7/2014 |
| WO | 2005122509 A1 | 12/2005 |

(Continued)

OTHER PUBLICATIONS

Unknown, Author, "Characteristics of Additional Carrier Types", 3GPP TSG-Ran WG1#67; R1-114020; San Francisco, U.S.A., Nov. 14-18, 2011, pp. 1-6.

(Continued)

*Primary Examiner* — Scott M Sciacca
(74) *Attorney, Agent, or Firm* — Murphy, Bilak & Homiller, PLLC

(57) ABSTRACT

Embodiments herein relate, in some examples, to a method performed by a wireless device (10) for handling communication of the wireless device (10) in a multicarrier operation in a wireless communication network (1), wherein the wireless device (10) is configured with a discontinuous reception cycle and is served by a first serving cell and is served or expected to be served by a secondary serving cell. The secondary serving cell is provided on a lean carrier wherein reference signals are transmitted with a bandwidth that is variable between a first bandwidth and a second bandwidth, wherein the second bandwidth is narrower than the first bandwidth. The wireless device receives on the secondary serving cell, one or more reference signals assumed by the wireless device (10) to have been transmitted on the secondary serving cell over the second bandwidth.

(Continued)

The wireless device (10) receives, on the first serving cell, a secondary cell setup command for the secondary serving cell, which secondary cell setup command indicates a state transition of the secondary serving cell for the wireless device (10). The wireless device (10) further receives, upon reception of the secondary cell setup command, on the secondary serving cell, one or more reference signals assumed by the wireless device (10) to have been transmitted on the secondary serving cell over the first bandwidth.

22 Claims, 13 Drawing Sheets

(51) Int. Cl.
*H04W 24/10* (2009.01)
*H04W 76/28* (2018.01)
*H04W 76/30* (2018.01)

(56) References Cited

U.S. PATENT DOCUMENTS

2016/0174014 A1* 6/2016 You .................. H04L 5/005
370/312
2017/0250786 A1* 8/2017 Better .................. H04W 76/28
2017/0288822 A1* 10/2017 Lagerqvist ............ H04L 5/0007

FOREIGN PATENT DOCUMENTS

| WO | 2008097965 A2 | 8/2008 | |
|---|---|---|---|
| WO | 2014112936 A1 | 7/2014 | |
| WO | 2014168552 A2 | 10/2014 | |
| WO | 2015137660 A1 | 9/2015 | |
| WO | 2016032381 A1 | 3/2016 | |
| WO | 2016185444 A1 | 11/2016 | |
| WO | WO-2017109549 A1 * | 6/2017 | ........... H04B 7/0617 |

OTHER PUBLICATIONS

Unknown, Author, "Discussion on some issues of additional carrier types", 3GPP TSG-Ran WG1 Meeting #67 R1-113754; San Francisco, USA, Nov. 14-18, 2011, pp. 1-4.

Unknown, Author, "New LTE WI on UE requirements for network-based CRS mitigation", 3GPP TSG Ran Meeting #76; RP-171408; West Palm Beach, USA, Jun. 5-8, 2017, pp. 1-7.

Unknown, Author, "On the scenarios for network-based CRS interference mitigation", 3GPP TSG Ran WG4 Meeting #84; R4-1707711; Berlin, Germany, Aug. 21-25, 2017, pp. 1-3.

* cited by examiner

Figure 5A: An example of First and second BW configurations (BW1 and BW2) when SCell is deactivated (in deactivation state) and during the SCell activation procedure respectively.

Figure 5B: An example of First and second BW configurations (BW1 and BW2) when SCell is activated (in activation state) and during the SCell deactivation procedure respectively.

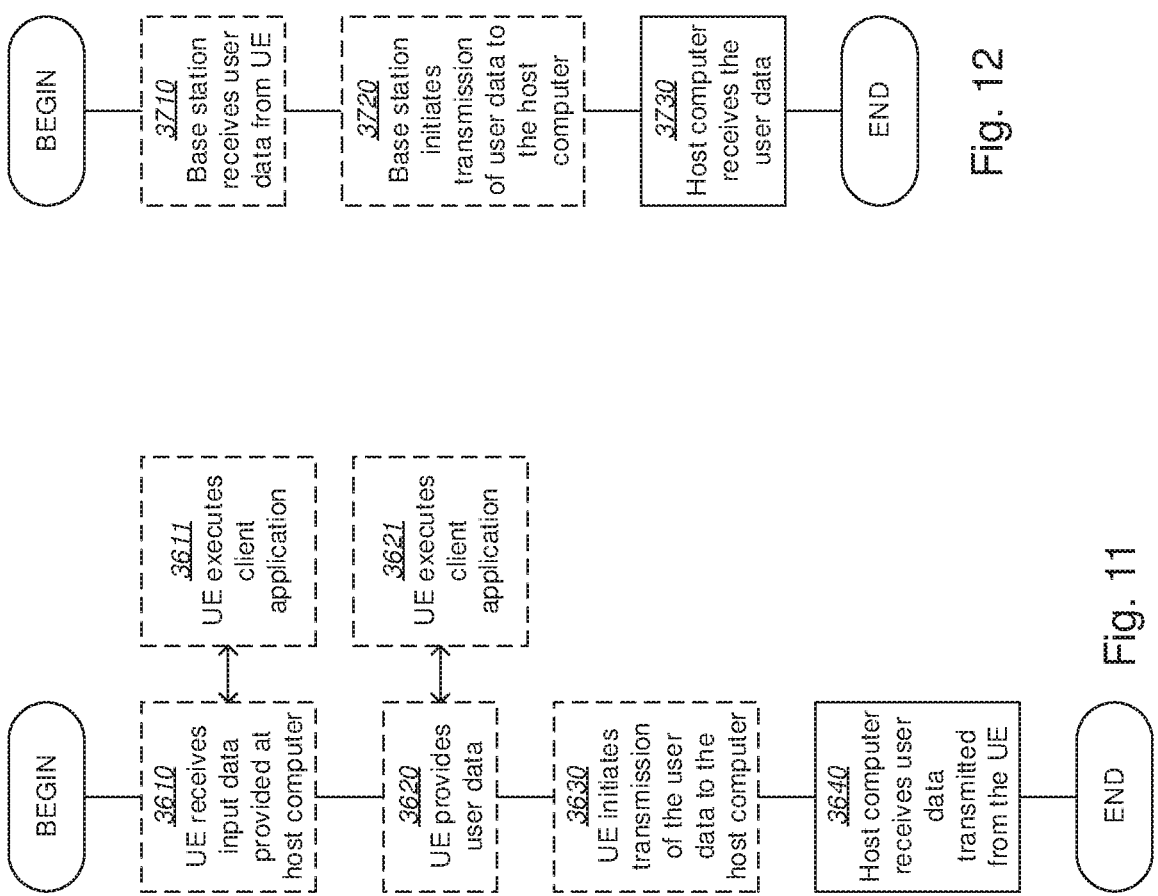

RADIO NETWORK NODE, WIRELESS DEVICE AND METHODS PERFORMED THEREIN

TECHNICAL FIELD

Embodiments herein relate to a wireless device, a radio network node and methods performed therein for communication. Furthermore, a computer program product and a computer readable storage medium are also provided herein. In particular, embodiments herein relate to handling communication between the wireless device and a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB, or a gNodeB. A service area or cell area is a geographical area where radio coverage is provided by the radio network node. The radio network node communicates over an air interface operating on radio frequencies with wireless devices within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UTRAN, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Reduction of power consumption is important for wireless devices using battery or an external power supply and its importance increases with the continued growth of device populations and more demanding use cases. The importance can be illustrated by the following scenarios, e.g.:

For Machine to Machine (M2M) use cases like sensors that run on battery it is a major cost to on site exchange, or charge, the batteries for a large amount of wireless devices and the battery lifetime may even determine the wireless device's lifetime if it is not foreseen to charge or replace the battery;

Even for scenarios where wireless devices may consume power from an external power supply, it may be desirable to consume less power for energy efficiency purposes.

To facilitate reduction of power consumption in the wireless device, 3GPP defined Discontinuous reception (DRX) operation for wireless devices in Radio Resource Control (RRC) states such as RRC_CONNECTED and RRC_IDLE states, and recently also defined eDRX operation for wireless devices in RRC_CONNECTED and RRC_IDLE states in LTE, as well as eDRX operation for wireless devices in RRC_IDLE state in UTRA.

To reduce power consumption in radio network nodes such as eNodeBs, a Work Item (WI) on network-based Cell specific reference signals (CRS) mitigation was approved in RP-171408, "New Work Item on UE requirements for network-based CRS mitigation for LTE", Ericsson, 3GPP RAN #76, June 2017.

Network-Based CRS Interference Mitigation.

Right from the start in Release 8 (Rel-8), LTE has been designed to rely on CRSs, which are transmitted using full system bandwidth and in all downlink (DL) subframes of an LTE radio frame. CRS serves quite many important purposes for wireless devices to perform measurements such as for cell search, mobility, time/frequency synchronization, channel estimation and radio resource management.

However, currently CRS is transmitted independently of the actual load in the network or cell and as such it causes a considerable interference floor in cellular networks. Especially in times of low and medium network load, transmitting less CRS leads to lower inter-cell interference levels, which directly results in significantly higher data rates for the wireless device. Network-based CRS mitigation is especially powerful when being combined with higher order modulation, e.g., 256 Quadrature Amplitude Modulation (QAM), since the cell coverage area for higher order modulation is significantly increased. In addition, the always-on CRS transmissions require radio network nodes to stay 'on' all the times, whereas network-based CRS mitigation allows radio network nodes to save energy.

Removing CRS completely, e.g., as it was done for DL Licensed Assisted Access (LAA) using Frame Structure 3 and as it has been envisioned for the 5G New Radio (NR), would have the greatest effect but it renders the LTE carrier non-backwards compatible meaning that legacy wireless devices would not be able to use such a carrier. However, CRS can also be reduced cautiously and selectively such that legacy wireless devices can still be served and that inter-cell interference can be significantly reduced.

The approved WI on network-based CRS mitigation also enable reduction of inter-cell interference caused by CRS see RP-171408, "New Work Item on UE requirements for network-based CRS mitigation for LTE", Ericsson, 3GPP RAN #76, June 2017.

For frequency domain CRS reduction one can distinguish between RRC IDLE and RRC CONNECTED state (mode) operation. For supporting wireless devices in IDLE state, CRS can be reduced to the inner 6 physical resource blocks (PRBs) as wireless devices can be configured to only use those PRBs for cell selection. However, during paging occasions, system information transmissions, and random access windows CRS has to be transmitted using full bandwidth. For supporting wireless devices in CONNECTED state or mode, CRS has to be transmitted full bandwidth whenever a UE is active.

Frequency domain CRS reduction can be accompanied by time domain CRS reduction by means of configuring Multi Broadband Single Frame Network (MBSFN) subframes, which contain CRSs only in 1 or 2 out of 14 orthogonal frequency-division multiplexing (OFDM)-symbols.

FIG. 1 illustrates an example operation with network-based CRS mitigation, where "muted CRS" refers to using the shortened CRS bandwidth, center 6 Resource Blocks (RB). Thus, CRS are periodically transmitted over a reduced bandwidth during wireless device inactive periods and over full bandwidth during wireless device active periods. There may also be a warm-up period before the wireless device active period, and a cool-down period after the wireless device active period, when transmission of CRS over full bandwidth may be required.

In lean carrier operation the Bandwidth (BW) of the CRS in a cell can be reduced, e.g. to 6 RBs, when there is no wireless device activity. However the network is not always fully aware when and for which procedure the wireless device needs to receive CRS over larger BW or full BW in the cell. The wireless device performance may be degraded or the wireless device may fail certain operations if the CRS bandwidth is reduced in the serving or neighbor cell, especially when the wireless device is not aware of the CRS BW reduction. On the other hand to achieve sufficient system gain, e.g. higher system throughput, the network should not unnecessarily transmit CRS over full or larger BW in the cell. This is particularly challenging for the wireless device configured for multicarrier operation under lean carrier operation, since e.g. carrier aggregation (CA) operation should ensure higher user throughput.

SUMMARY

An object of embodiments herein is to provide a mechanism for improving performance of the wireless communication network in an efficient manner.

According to an aspect the object is achieved by providing a method performed by a wireless device for handling communication of the wireless device in a multicarrier operation in a wireless communication network. The wireless device is configured with a discontinuous reception cycle and is served by a first serving cell and is also served, or expected to be served, by a secondary serving cell, wherein the secondary serving cell is provided on a lean carrier wherein reference signals are transmitted with a bandwidth that is variable between a first bandwidth and a second bandwidth. The second bandwidth is narrower than the first bandwidth. The wireless device receives, on the secondary serving cell, one or more reference signals assumed by the wireless device to have been transmitted on the secondary serving cell over the second bandwidth. The wireless device further receives, on the first serving cell, a secondary cell setup command for the secondary serving cell, which secondary cell setup command indicates a state transition of the secondary serving cell for the wireless device. The wireless device receives, upon reception of the secondary cell setup command, on the secondary serving cell, one or more reference signals assumed by the wireless device to have been transmitted on the secondary serving cell over the first bandwidth.

According to another aspect the object is achieved by providing a method performed by a radio network node for handling communication of a wireless device in a multicarrier operation in a wireless communication network, wherein the radio network node is configured to provide a secondary serving cell for the wireless device, wherein the wireless device is configured with a discontinuous reception cycle and is served by a first serving cell and also served, or expected to be served, by the secondary serving cell. The secondary serving cell is provided on a lean carrier wherein reference signals are transmitted with a bandwidth that is variable between a first bandwidth and a second bandwidth, wherein the second bandwidth is narrower than the first bandwidth. The radio network node transmits, on the secondary serving cell, one or more reference signals over the second bandwidth. The radio network node obtains an indication indicating a state transition of the secondary serving cell for the wireless device; and upon obtaining the indication, the radio network node transmits, on the secondary serving cell, one or more reference signals over the first bandwidth.

According to yet another aspect the object is achieved by providing a wireless device for handling communication of the wireless device in a multicarrier operation in a wireless communication network. The wireless device is configured with a discontinuous reception cycle and configured to be served by a first serving cell and also configured to be served, or expected to be served, by a secondary serving cell, wherein the secondary serving cell is provided on a lean carrier wherein reference signals are transmitted with a bandwidth that is variable between a first bandwidth and a second bandwidth, wherein the second bandwidth is narrower than the first bandwidth. The wireless device is configured to receive, on the secondary serving cell, one or more reference signals assumed by the wireless device to have been transmitted on the secondary serving cell over the second bandwidth. The wireless device is further configured to receive, on the first serving cell, a secondary cell setup command for the secondary serving cell, which secondary cell setup command indicates a state transition of the secondary serving cell for the wireless device. The wireless device is further configured to, upon reception of the secondary cell setup command, receive, on the secondary serving cell, one or more reference signals assumed by the wireless device to have been transmitted on the secondary serving cell over the first bandwidth.

According to yet another aspect the object is achieved by providing a radio network node for handling communication of a wireless device in a multicarrier operation in a wireless communication network. The radio network node is configured to provide a secondary serving cell for the wireless device, wherein the wireless device is configured with a discontinuous reception cycle and is served by a first serving cell and also served, or expected to be served, by the secondary serving cell. The secondary serving cell is provided on a lean carrier wherein reference signals are transmitted with a bandwidth that is variable between a first bandwidth and a second bandwidth, wherein the second bandwidth is narrower than the first bandwidth. The radio network node is configured to transmit, on the secondary serving cell, one or more reference signals over the second bandwidth. The radio network node is further configured to obtain an indication indicating a state transition of the secondary serving cell for the wireless device; and upon obtaining the indication the radio network node is configured to transmit, on the secondary serving cell, one or more reference signals over the first bandwidth.

It is furthermore provided herein a computer program product comprising instructions, which, when executed on at least one processor, cause the at least one processor to carry out any of the methods above, as performed by the radio network node or the wireless device. It is additionally provided herein a computer-readable storage medium, having stored thereon a computer program product comprising instructions which, when executed on at least one processor, cause the at least one processor to carry out the method according to any of the methods above, as performed by the radio network node or the wireless device.

Embodiments herein provide a secondary cell setup procedure, e.g. for secondary serving cell configuration, activation or addition for a cell that can be implemented by the wireless device even when lean carrier operation is used in the secondary serving cell. Multicarrier operation, e.g. CA, dual connectivity etc., is enhanced by triggering transmission of reference signals over a wider bandwidth upon configuration, activation or addition of a secondary serving cell under lean carrier operation, and thereby secondary serving cell configuration, activation or addition does not fail on a lean carrier and thus performance of the wireless communication network is improved in an efficient manner.

BRIEF DESCRIPTION OF THE DRAWINGS

Embodiments will now be described in more detail in relation to the enclosed drawings, in which:

FIGS. 9-12 are flowcharts illustrating methods implemented in a communication system including a host computer, a base station and a user equipment.

DETAILED DESCRIPTION

Figure 1:
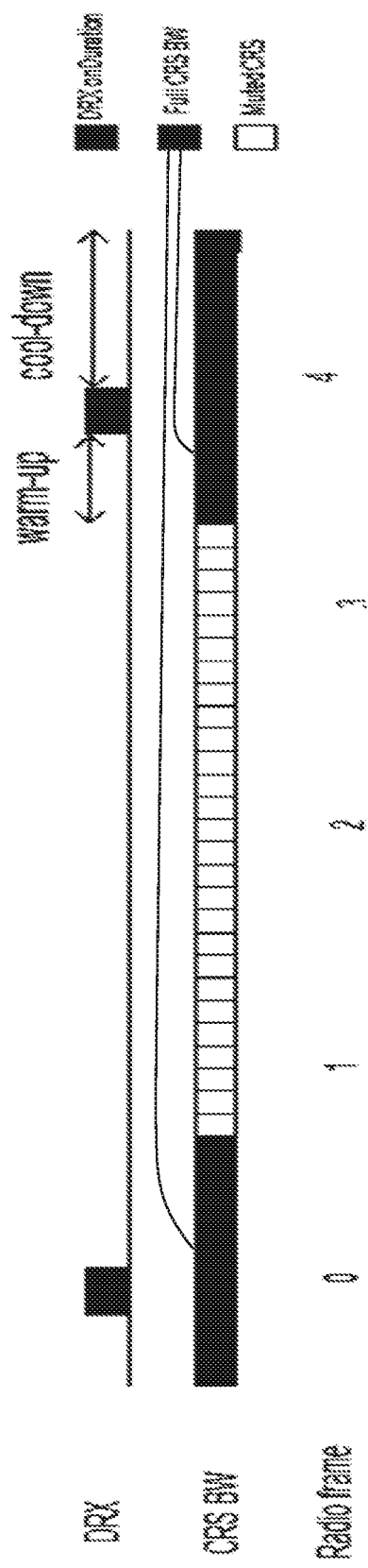
FIG. 1 is a schematic overview depicting transmission of reference signals according to prior art.

As part of development of embodiments a problem has first been identified. In carrier aggregation (CA) operation a wireless device is able to receive and/or transmit data to and from more than one serving cells. In other words, a CA capable wireless device can be configured to operate with more than one serving cell. The carrier of each serving cell is generally called a component carrier (CC). In simple words the component carrier (CC) means an individual carrier in a multi-carrier system. The term carrier aggregation (CA) is also called, e.g. interchangeably called, "multi-carrier system", "multi-cell operation", "multi-carrier operation", "multi-carrier" transmission and/or reception. This means that the CA is used for transmission of signaling and data in the uplink and downlink directions. One of the CCs is designated as the primary component carrier (PCC) or simply primary carrier or even anchor carrier. The remaining ones are designated as secondary component carriers (SCC) or simply secondary carriers or even supplementary carriers. The serving cell is interchangeably called primary cell (PCell), primary serving cell (PSC) or a secondary serving cell, which may be interchangeably called secondary cell (SCell) or secondary serving cell (SSC).

In another multicarrier operation called dual connectivity (DC), the wireless device is configured with a Master Cell Group (MCG) and a Secondary Cell Group (SCG). Cell Group (CG) is a group of serving cells associated with either master radio network node such as a master eNB (MeNB) or secondary radio network node such as a secondary eNB (SeNB). Master Cell Group (MCG) is a group of serving cells associated with the MeNB, comprising the PCell and optionally one or more SCells. Secondary Cell Group (SCG) is a group of serving cells associated with the SeNB comprising a Primary Scell (PSCell) and optionally one or more SCells.

A multi-carrier secondary cell (SCell) setup or SCell release procedure herein refers to procedures which enable the radio network node to at least temporarily setup or release the use of an SCell, in DL and/or UL by the CA capable wireless device. Herein the multi-carrier SCell setup or release procedure or command or operation may perform any one or more of the following:

Configuration of SCell(s) aka SCell addition
De-configuration of SCell(s) aka SCell release
Activation of SCell(s)
Deactivation of SCell(s)
Configuration of PSCell(s) aka PSCell addition in DC
De-configuration of PSCell(s) aka PSCell release in DC The configuration procedure of SCell, i.e. addition of SCell, is used by the serving radio network node, e.g. eNode B in LTE, to configure a CA capable wireless device with one or more SCells, e.g. downlink (DL) SCell, uplink (UL) SCell or both. On the other hand, the de-configuration procedure, i.e. release of SCell, is used by the serving radio network node to de-configure or remove one or more already configured SCells, e.g. DL SCell, UL SCell or both. The configuration and de-configuration are done by the radio network node using e.g. Radio Resource Control (RRC) signaling in LTE.

The configuration procedure of PSCell, i.e. addition of PSCell, is used in DC by the serving radio network node, e.g. MeNodeB in LTE, to configure a DC capable wireless device with, or add, PSCell in SCG. On the other hand, the de-configuration of PSCell, i.e. release procedure of the PSCell, is used by the MeNodeB to de-configure or release or remove or change already configured PSCell. The configuration and de-configuration are done by the MeNodeB using RRC signaling in LTE.

The serving radio network node, e.g. eNodeB in LTE, may activate one or more deactivated SCells or deactivate one or more SCells on the corresponding configured secondary carriers. The PCell is always activated. The configured SCells are initially deactivated upon addition and after a cell change e.g. handover. In LTE the activation and deactivation command is sent by the eNodeB via media access control (MAC) control element (MAC-CE).

In the existing solutions SCell activation and deactivation delay requirements exist as explained below:

SCell activation delay is a delay within which the wireless device shall be able to activate the deactivated SCell and it depends upon specified conditions. Upon receiving SCell activation command in subframe 'n', the wireless device shall be capable to transmit valid Channel State Information (CSI) report for the SCell being activated no later than in subframe 'n'+24 provided certain pre-defined conditions are met for the SCell. Otherwise upon receiving the SCell activation command in subframe 'n', the wireless device shall be capable to transmit valid CSI report for the SCell being activated no later than in subframe 'n'+34 provided the SCell can be successfully detected on the first attempt. The valid CSI is based on the wireless device measurement and corresponds to any pre-defined Channel Quality Indicator (CQI) value with the exception of CQI index=0 (out of range).

SCell activation may be performed
- blindly, or for unknown cell, i.e., when the wireless device has not performed any recent measurement of the cell ("cold start"), or
- for a known cell, i.e., when the wireless device has measured and reported the cell before the activation command was received.

During SCell activation, the wireless device may perform the following actions:
- decode the Medium Access Control-Control Element (MAC-CE) containing the activation command and send back Acknowledgement (ACK) (4 ms)
- perform all the internal steps needed to activate the SCell, e.g. turn on the Radio Frequency (RF) chain that will be processing the CC
- adjust the Automatic Gain Control (AGC), this step will depend on whether the cell is known or not, when the cell was last measured, etc.
- acquire the exact timing of the cell, this step also depends on whether the cell is known or unknown,
- process one or more instances of reference signals based on which it should compute the CQI and report the CQI to the eNB (e.g., within 4 ms).

SCell Deactivation Delay

Upon receiving SCell deactivation command or upon expiry of the sCellDeactivationTimer in subframe 'n', the wireless device shall accomplish the deactivation actions for the SCell being deactivated no later than in subframe 'n'+8.

In lean carrier operation the bandwidth (BW) of the CRS in a cell can be, e.g. to 6 RBs, when there is no wireless device activity. However the network is not always fully aware when and for which procedure the wireless device needs to receive CRS over larger BW or full BW in the cell. The wireless device performance is degraded or the wireless device can fail certain operation if the CRS bandwidth is reduced in the serving or neighbor cell, especially when the wireless device is not aware of the CRS BW reduction. On the other hand to achieve sufficient system gain, e.g. higher system throughput, the network should not unnecessarily transmit CRS over full or larger BW in the cell. This is particularly challenging for the wireless device configured for multicarrier operation under lean carrier operation, since CA operation should ensure higher user throughput.

Figure 2:
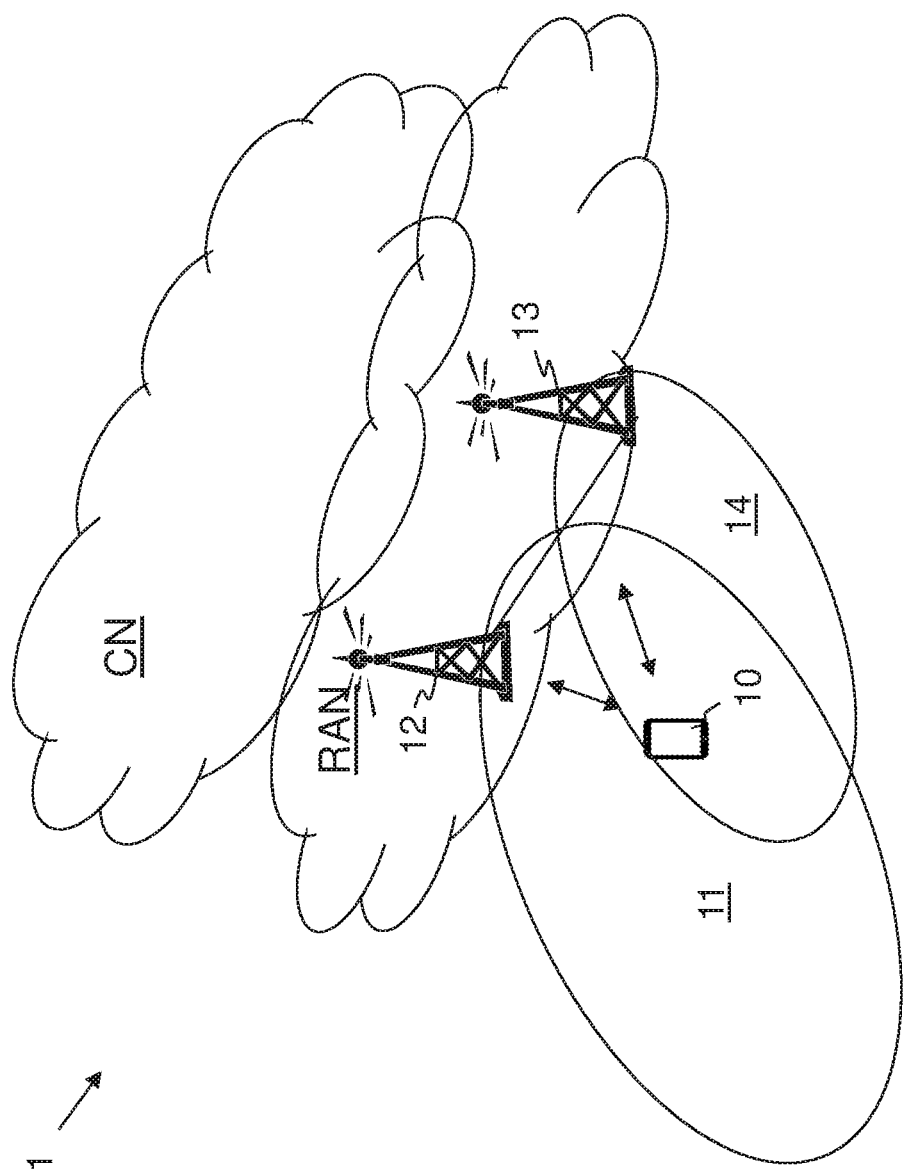
FIG. 2 is a schematic overview depicting a wireless communication network according to embodiments herein.

Embodiments herein relate to communication networks in general. FIG. 2 is a schematic overview depicting a wireless communication network 1. The communication network 1 comprises one or more RANs e.g. a first RAN (RAN1), connected to one or more CNs. The communication network 1 may use one or a number of different technologies, such as Long Term Evolution (LTE), LTE-Advanced, New Radio (NR) of 5G, Wideband Code Division Multiple Access (WCDMA), Global System for Mobile communications/ Enhanced Data rate for GSM Evolution (GSM/EDGE), Worldwide Interoperability for Microwave Access (WiMax), or Ultra Mobile Broadband (UMB), just to mention a few possible implementations. Embodiments are applicable to 5G and also in further development of the existing communication systems such as e.g. 3G and LTE.

In the wireless communication network 1, wireless devices e.g. a wireless device 10 such as a mobile station, a non-access point (non-AP) STA, a STA, a user equipment and/or a wireless terminal, are connected via the one or more RANs, to the one or more CNs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a first radio network node 12. The first radio network node 12 is exemplified herein as a RAN node providing radio coverage over a geographical area, a service area 11, of a radio access technology (RAT), such as NR, LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a wireless device within the service area served by the first radio network node 12 depending e.g. on the radio access technology and terminology used and may be denoted as a scheduling node, serving radio network node or primary serving radio network node providing a primary serving cell for the wireless device 10.

The wireless communication network 1 further comprises a second radio network node 13, the radio network node 13 for short. The second radio network node 13 is exemplified herein as a RAN node providing radio coverage over a geographical area, a second service area 14, of a radio access technology (RAT), such as NR, LTE, UMTS, Wi-Fi or similar. The second radio network node 13 may be denoted as a secondary node, secondary serving radio network node providing a secondary serving cell for the wireless device 10. It should be noted that a service area may be denoted as 'cell', beam, beam group or similar to define an area of radio coverage.

It should further be understood that the first and second service area may also be provided by a single radio network node such as the first radio network node 12 or the second radio network node 13.

Embodiments herein relate to methods of adapting reference signal BW configuration based on secondary cell setup or release command and the corresponding methods in the wireless device.

In the scenario it is assumed that the wireless device 10 is capable of multicarrier operation, e.g. carrier aggregation, dual connectivity etc. The wireless device 10 is served by at least one serving cell, herein denoted as a first cell, first serving cell, cell1 or first service area 11. Examples of cell1 are PCell, PSCell, etc. The wireless device 10 is further configured, or is configured or expected to be configured, to setup or release at least one more cell, herein denoted as a second cell, secondary cell or secondary serving cell, cell2 or second service area 14. Examples of setup or release of cell2 are: addition of cell2, e.g. addition of PSCell; release of cell2, e.g. release of PSCell; activation of cell2, e.g. SCell activation; deactivation of cell2, e.g. SCell deactivation; etc. Cell2 is also called as a serving cell, a secondary serving cell or a secondary cell. Examples of the secondary serving cell are SCell, PSCell etc.

Furthermore, the lean carrier operation is applied in a cell when the wireless device 10 is configured with DRX or eDRX cycle. For example if the wireless device 10 is in a Radio Resource Control (RRC) connected state then the serving cell of that wireless device 10 transmits RS, e.g. CRS, over the entire bandwidth of the serving cell. In other words during OFF and ON durations of the DRX cycle the RS are transmitted over reduced BW and full BW respectively.

According to embodiments herein the wireless device 10 is served by the first serving cell and also served by, or expected to be served by, the secondary serving cell, wherein the secondary serving cell is provided on a lean carrier wherein reference signals are transmitted with a bandwidth that is variable between a first bandwidth and a second bandwidth. The reference signals may for example be transmitted variably over two bandwidths, the first bandwidth and the second bandwidth, such that the reference signals are transmitted with a bandwidth that is alternately variable between the first and second bandwidths. The second bandwidth is narrower than the first bandwidth. The wireless device 10 receives on the secondary serving cell, RS(s) assumed by the wireless device 10 to have been transmitted on the secondary serving cell over the second bandwidth. The wireless device 10 further receives, via the first serving cell, a secondary cell setup command for the secondary serving cell. The secondary cell setup command indicates a state transition of the secondary serving cell for the wireless device 10. Upon reception of, i.e. in response to receiving, the secondary cell setup command, the wireless device receives, on the secondary serving cell, RS(s) assumed by the wireless device 10 to have been transmitted on the secondary serving cell over the first bandwidth.

Due to embodiments herein activation, configuration or addition of the secondary serving cell as a serving cell will not fail, or the risk of failing is at least reduced, and thus performance of the wireless communication network is improved in an efficient manner.

Figure 3A:
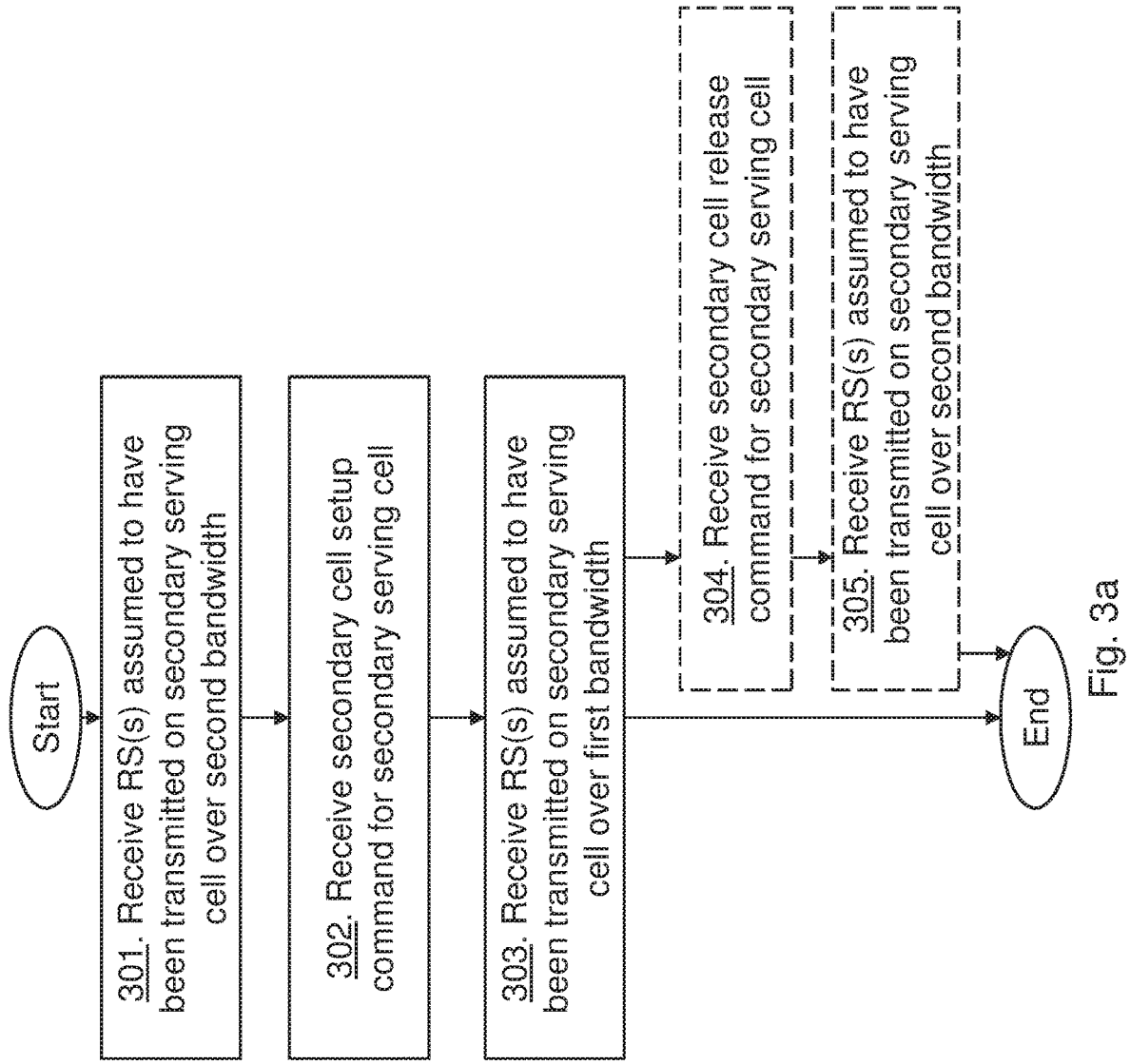
FIG. 3a is a flowchart depicting a method performed by a wireless device according to embodiments herein.

The method actions performed by the wireless device 10 for handling communication of the wireless device 10 in a multicarrier operation in the wireless communication network 1 according to embodiments will now be described with reference to a flowchart depicted in FIG. 3a. The actions do not have to be taken in the order stated below, but may be taken in any suitable order. Actions performed in some embodiments are marked with dashed boxes. The wireless device 10 is configured with a DRX or eDRX cycle, generally denoted as discontinuous reception cycle, and is served by the first serving cell and also served, or expected to be served, by the secondary serving cell. The secondary serving cell is provided on a lean carrier wherein reference signals are transmitted over a bandwidth that is variable between a first and a second bandwidth, i.e. transmitted variably over two bandwidths, the first bandwidth and the second bandwidth. The second bandwidth is narrower than the first bandwidth. The one or more reference signals may be CRSs. The difference between the first bandwidth and the second bandwidth may be larger than or equal to a threshold. The first and second bandwidths and the threshold may be expressed in number of resource blocks. For example, the second bandwidth may comprise or span six resource blocks and the first bandwidth may comprise or span a threshold number of resource blocks, such as at least one resource block, more than the second bandwidth.

Action 301. The wireless device 10 receives, on the secondary serving cell, one or more reference signals assumed by the wireless device 10 to have been transmitted on the secondary serving cell over the second bandwidth.

Action 302. The wireless device 10 receives, on or via the first serving cell, a secondary cell setup command for the secondary serving cell, which secondary cell setup command indicates a state transition of the secondary serving cell for the wireless device 10. The state transition may be a configuration, an addition, or an activation of the secondary serving cell.

Action 303. Upon, or in response to, reception of the secondary cell setup command, the wireless device 10 receives, on the secondary serving cell, one or more reference signals assumed by the wireless device 10 to have been transmitted on the secondary serving cell over the first bandwidth. For example, the wireless device 10 assumes, during a time period required to perform a secondary cell setup procedure that the one or more reference signals received on the secondary serving cell are transmitted, by the radio network node providing the secondary serving cell, over the first bandwidth. Thus, during configuration, addition, or activation of the secondary serving cell, RSs are transmitted over a wide bandwidth.

Action 304. The wireless device 10 may further receive, on or via the first serving cell, a secondary cell release command for the secondary serving cell. The secondary cell release command indicates a further state transition of the secondary serving cell for the wireless device. The further state transition may be a release, or a deactivation of the secondary serving cell.

Action 305. Upon reception of the secondary cell release command, i.e. in response to receiving the secondary cell release command, the wireless device 10 may receive, on the secondary serving cell, one or more reference signals assumed by the wireless device 10 to have been transmitted on the secondary serving cell over the second bandwidth. For example, the wireless device 10 assumes, during a time period when the wireless device performs a secondary cell release procedure, that the one or more reference signals received on the secondary serving cell are transmitted, by the radio network node providing the secondary serving cell, over the second bandwidth. The time period may in some embodiments be a time period required for performing the secondary cell release procedure.

Figure 3B:
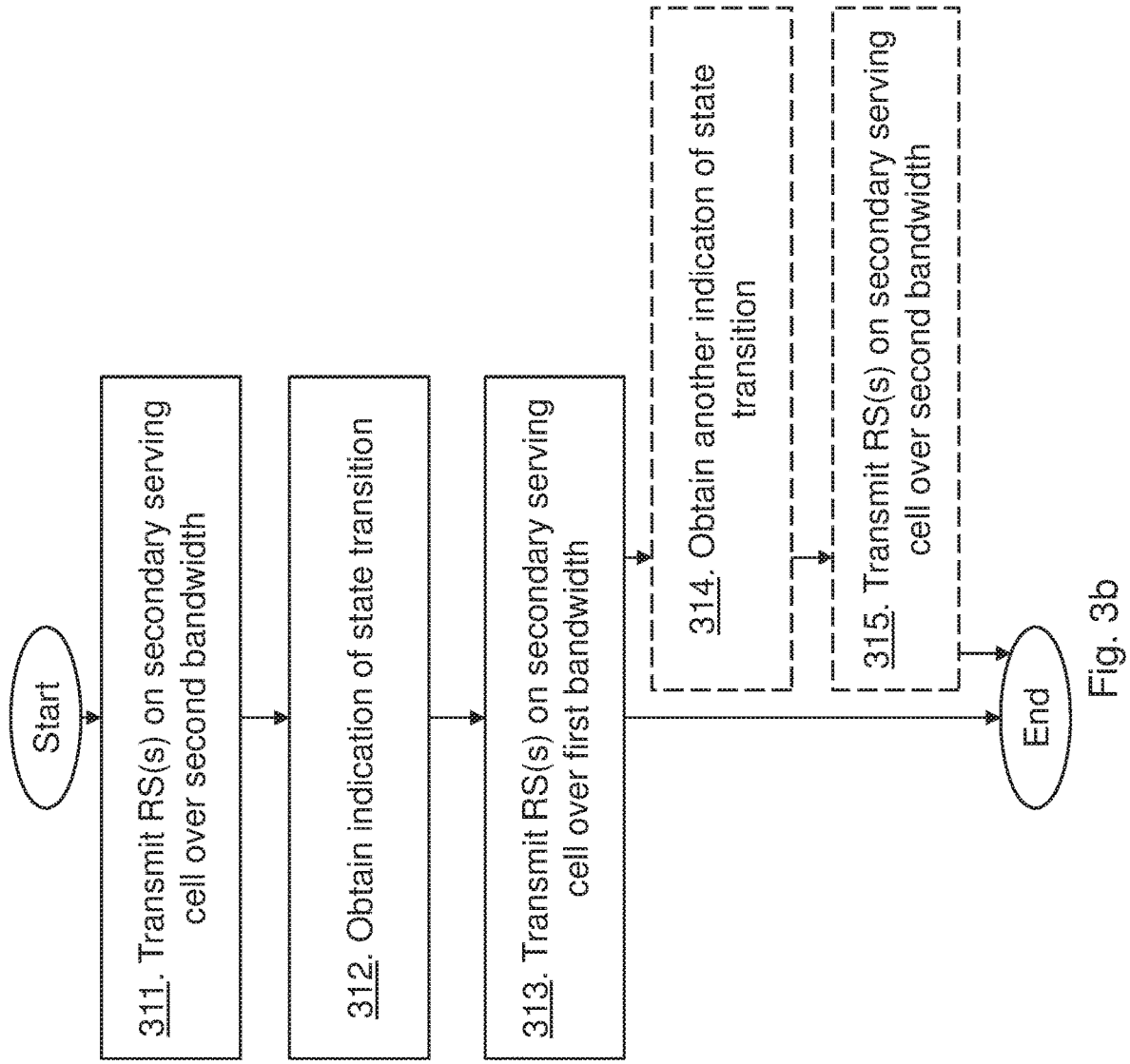
FIG. 3b is a flowchart depicting a method performed by a radio network node according to embodiments herein.

The method actions performed by the radio network node, such as the first radio network node 12 or the second radio network node 13, for handling communication of the wireless device 10 in a multicarrier operation in the wireless communication network 1 according to embodiments will now be described with reference to a flowchart depicted in FIG. 3b. The actions do not have to be taken in the order stated below, but may be taken in any suitable order. Actions performed in some embodiments are marked with dashed boxes. The radio network node is configured to provide the secondary serving cell for the wireless device 10, wherein the wireless device 10 is configured with a discontinuous reception cycle, e.g. DRX or eDRX, and is served by the first serving cell and also served, or expected to be served, by the secondary serving cell. The secondary serving cell is provided on a lean carrier wherein reference signals are transmitted with a bandwidth that is variable between a first bandwidth and a second bandwidth, i.e. transmitted variably over two bandwidths, the first bandwidth and the second bandwidth, wherein the second bandwidth is narrower than the first bandwidth. The one or more reference signals may be CRSs. The difference between the first bandwidth and the second bandwidth may be larger than or equal to a threshold. The first and second bandwidths and the threshold may be expressed in number of resource blocks. For example, the second bandwidth may comprise or span six resource blocks and the first bandwidth may comprise or span a threshold number of resource blocks, such as at least one resource block, more than the second bandwidth.

Action 311. The radio network node transmits, on the secondary serving cell, one or more reference signals over the second bandwidth.

Action 312. The radio network node obtains an indication indicating a state transition of the secondary serving cell for the wireless device 10. The indication may be a secondary cell setup command received from another radio network node, e.g. for a situation where the secondary serving cell is provided by the second radio network node 13, the another radio network node may be the first radio network node 12 providing the first serving cell. Alternatively or additionally, the indication may be measurements of the wireless device 10 received by the radio network node, e.g. the first radio network node 12, on the first serving cell. The state transition may be a configuration, an addition, or an activation of the secondary serving cell.

Action 313. Upon, or in response to, obtaining the indication, the radio network node transmits, on the secondary serving cell, one or more reference signals over the first bandwidth. For example, the radio network node may transmit the one or more reference signals such that the wireless device 10 may receive, on the secondary serving cell, the one or more reference signals over the first bandwidth during a time period required for the wireless device 10 to perform a secondary cell setup procedure. E.g. the radio network node may initiate a transmission, to the wireless device 10 on or via the first serving cell, of the secondary cell setup command for the secondary serving cell. The transmission of the secondary cell setup command to the wireless device 10 may be initiated in response to the obtained indication in action 312 being a measurement of the wireless device 10 received by the radio network node, e.g. the first radio network node 12, on the first serving cell, that indicates a state transition of the secondary serving cell for the wireless device 10. The obtained indication may thus trigger a transmission, to the wireless device 10 on the first serving cell, of a secondary cell setup command for the secondary serving cell, which secondary cell setup command indicates the state transition of the secondary serving cell for the wireless device 10. Thus, during configuration, addition, or activation RSs are transmitted over a wide bandwidth.

Action 314. The radio network node may further obtain another or further indication indicating a further state transition of the secondary serving cell for the wireless device 10. The other or further indication may be a secondary cell release command received from another radio network node, e.g. for a situation where the secondary serving cell is provided by the second radio network node 13, the another radio network node may be the first radio network node 12 providing the first serving cell. Alternatively or additionally, the other or further indication may be measurements of the wireless device 10 received by the radio network node, e.g. the first radio network node 12, on the first serving cell. The other or further indication may in this latter case trigger a transmission, to the wireless device 10 on the first serving cell, of a secondary cell release command for the secondary serving cell, which secondary cell release command indicates the further state transition of the secondary serving cell for the wireless device 10. The further state transition may be a de-configuration, a release, or a deactivation of the secondary serving cell.

Action 315. The radio network node may upon, or in response to, obtaining the other or further indication transmit, on the secondary serving cell, one or more reference signals over the second bandwidth. For example, the radio network node may transmit the one or more reference signals such that the wireless device 10 may receive, on the secondary serving cell, the one or more reference signals over the second bandwidth during a time period when the wireless device performs a secondary cell release procedure. The time period may in some embodiments be a time period required for performing the secondary cell release procedure. Thus, during de-configuration, release, or deactivation RSs are transmitted over a narrow bandwidth.

According to embodiments herein the wireless device 10 is capable of multicarrier operation and is served by, or expected to be served by, at least one secondary cell, such as the second service area 14, being associated with a lean carrier operation. In a lean carrier operational mode, in at least certain time resources a cell, or a radio network node providing the cell, transmits reference signals, e.g. CRS, over a reduced bandwidth (Br); where Br<Bm, and where Bm is the bandwidth of the cell.

In a scenario the radio network node 13 transmits one or more reference signals (RS) in the secondary serving cell according to a first bandwidth configuration over a time period when the secondary serving cell is being setup and/or released as the secondary serving cell of the wireless device 10. But otherwise, i.e. when no serving cell is being setup or released, the radio network node 13 transmits RS in the secondary cell 14 according to a second bandwidth configuration. The total time when larger or full BW RS are needed is thus T=Tsetup+Tactive+Trelease, where Tsetup is a part or all the time during SCell setup when larger/full RS BW is needed, Tactive is a part or all the time during SCell active time period when larger/full RS BW is needed, and Trelease is a part or all the time during SCell release when larger/full RS BW is needed, and at least one of Tsetup and Trelease is non-zero.

For example when the cell, e.g. SCell, is being activated by the wireless device 10 then the RS, e.g. CRS, is transmitted in the cell over the full BW; but otherwise when the cell is NOT being activated by the wireless device 10 then the RS is transmitted in the cell over a reduced BW (e.g. over 6 central RBs within the cell's BW). This allows the wireless device 10 to successfully activate the serving cell during the specified time period (i.e. during SCell activation time) as the wireless device 10 needs to use larger BW of the RS during the serving cell activation procedure. The wireless device 10 operating under lean carrier operation in the cell will apply the activation procedure provided that the RS is transmitted over full BW; otherwise the wireless device 10 is allowed to abort, restart or extend the activation procedure to avoid performance degradation.

In a further embodiment, the embodiments herein may further apply to a case when only a first SCell or PSCell is being activated for a given UE (but not when the UE already operates at least one active SCell/PScell) or when the last active SCell or PSCell is being deactivated (but not when the UE has at least one other remaining active SCell/PSCell).

When multiple wireless devices are present in a cell, the cell RS BW during a certain time may be the maximum RS bandwidth over the RS BWs needed for each wireless device present in the cell.

Actions that may be performed by the wireless device 10 and the radio network node 13 are summarized below.

Figures 4A, 4B:
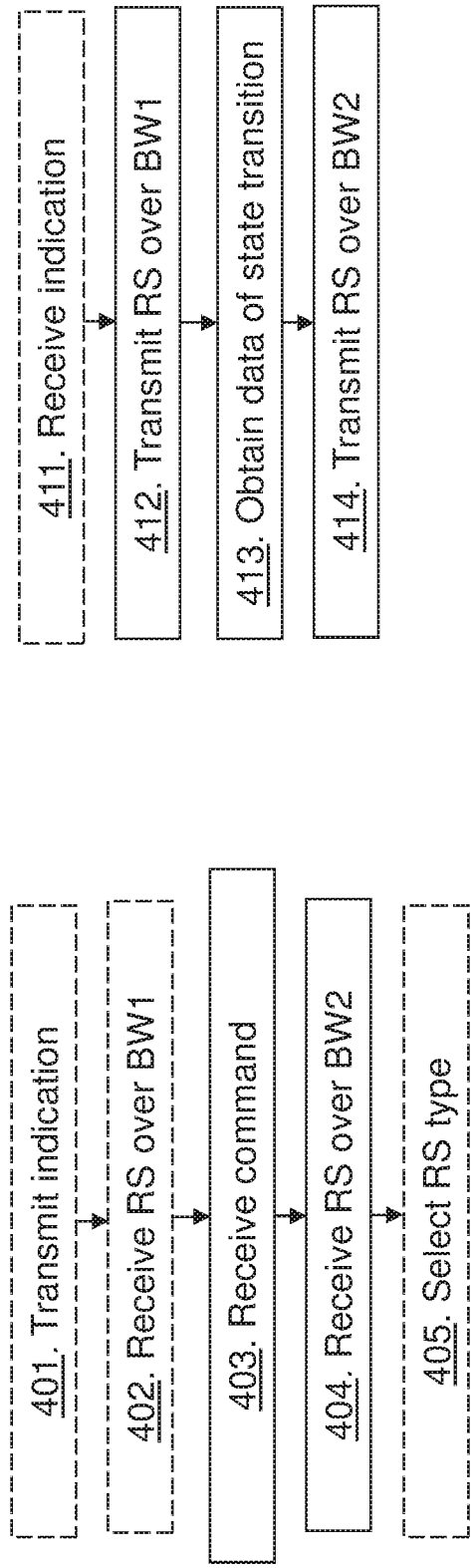
FIG. 4a is a flowchart depicting a method performed by a wireless device according to some embodiments herein.
FIG. 4b is a schematic flowchart depicting a method performed by a radio network node according to some embodiments herein.

Methods performed by the wireless device 10 served by the first radio network node 12, see FIG. 4a, may e.g. comprise:

Action 401 (in some embodiments): The wireless device 10 may indicate to the second radio network node 13 or the first radio network node 12 an ability of the wireless device 10 to operate according to one or more embodiments described herein, e.g. capable to assume upon reception of the command that RS is transmitted over the second bandwidth e.g. during activation of the secondary serving cell.

Action 402: The wireless device 10 may, when already being served in the secondary cell, receive a reference signal (RS) in the secondary cell (cell2) using a first bandwidth configuration (BW1) during a first time period (T1).

During the certain first time period (T1), the wireless device 10 receives reference signals (e.g. CRS) from the secondary cell (cell2) over the first BW configuration (BW1). During the first time period, T1, the wireless device 10 is not expected to perform any secondary cell setup or release procedure for the secondary cell, cell2, aka multicarrier SCell setup or release. The secondary cell setup or release procedure is performed by the wireless device 10 after the end of T1 as described in the next actions. The wireless device 10 uses the received RS according to the first bandwidth configuration (BW1) for performing one or more operations e.g. synchronization to cell2, measurements etc. In order to achieve this objective the second radio network node 13 transmits RS with BW1 in cell2 during T1, see action 412.

BW1 are described below with some examples. In one example BW1 is smaller than the cell2 BW (Bm) while in another example BW1 is equal to the cell2 BW (Bm). During T1 cell2, being the secondary serving cell of the wireless device, may either be in a state of activation or in a state deactivation. For example if cell2 is activated during T1 then during T1 BW1=Bm e.g. BW1=Bm=50 RBs. But if cell2 is deactivated during T1 then during T1, BW1<Bm e.g. BW1=6 RBs while Bm=50 RBs.

Action 403: The wireless device 10 may then receive a command, such as a secondary cell setup command or release command or message, from the first radio network node 12 to setup or release the secondary cell (cell2) as a secondary serving cell of the wireless device.

In this action, the wireless device 10 receives a secondary cell setup or release command or message or indication from the first radio network node 12 for instructing the wireless device 10 to setup or release the secondary cell (cell2) as a secondary serving cell.

The wireless device 10 may receive the command or message via a lower layer or a higher layer message. Examples of lower layer messages are Medium Access Control (MAC) command, layer 1 message such as via DL control channel, e.g. physical downlink control channel (PDCCH), etc. Examples of higher layer messages are Radio Resource Control (RRC) signaling, non-access stratum (NAS) signaling etc.

The wireless device 10 typically receives the secondary cell setup or release command or message at the end of T1. In other words cell2 transmits RS according to BW1 until the first radio network node 12 sends the secondary cell setup or release command or message to the wireless device 10.

Action 404: The wireless device 10 may then set up or release the secondary cell (cell2) as the secondary serving cell starting from a reference time (Tr) provided that the RS is received from the secondary cell using the second bandwidth, i.e. a second bandwidth configuration (BW2), during a second period (T2), where T2 starts at least T21 time units before Tr and ends no later than T22 after the completion of the setup or release procedure, and where BW1 and BW2 are different.

It should be noted that the wireless device 10 may receive BW information prior to performing the action 404 and performing according to the above if BW1 and BW2 are different or BW1−BW2>=threshold.

In this action, the wireless device 10 applies the received secondary cell set up or release command or message to setup or release cell2 as the secondary serving cell starting from the reference time (Tr). The wireless device 10 successfully performs the setup or release of cell2 provided e.g. following condition is set:

the RS is received by the wireless device 10 from cell2 using the second bandwidth configuration (BW2) during the second period (T2).

If the above condition is not met then the wireless device 10 aborts secondary cell set up or release procedure. This is because otherwise the wireless device 10 may execute the procedure inappropriately and may lead to disruption of multicarrier operation of the wireless device 10.

In order to ensure that the wireless device 10 is able to successfully perform the secondary cell set up or release procedure the second radio network node 13 transmits RS with BW2 in cell2 during T2, see action 414. The time period T2 starts at least $\Delta t21$ time units before Tr and ends no later than $\Delta t22$ after the completion of the setup or release procedure. Since T2 starts immediately after the end of T1 therefore Tr starts $\Delta t21$ time units after the end of T1. The duration $\Delta t21$ and $\Delta t22$ are also called as warmup time and cool down time respectively. During $\Delta t21$ the wireless device 10 adapts its receiver parameters for acquiring or receiving the RS from cell2 in order to initiate the SCell setup or release procedure. Whereas during $\Delta t22$ the wireless device 10 readjust its receiver parameters to pre-activation state (to reduce power consumption) after the completion of the SCell setup or release procedure. Therefore T2 typically consists of: the time (T2') to complete the secondary cell set up or release procedure for cell2, the warmup time ($\Delta t21$) which is just before cell2 set up or release procedure starts and the cool down time (Δt22) which is just after the set up or release procedure ends.

Examples of T2' (T2'=T2−Δt21−Δt22) may be: time period to activation SCell, time period to deactivate SCell, time period to add PSCell, time period to release PSCell etc.

As special case Δt21=0 and/or Δt22=0. When Δt21=Δt22=0 then T2'=T2.

In one example BW2 is smaller than the cell2 BW (Bm) while in another example BW2 is equal to the cell2 BW (Bm). During T2, whose duration depends upon the contents of the setup or release command or message, the wireless device 10 may either activate cell2 or deactivate cell2.

Figure 5A:
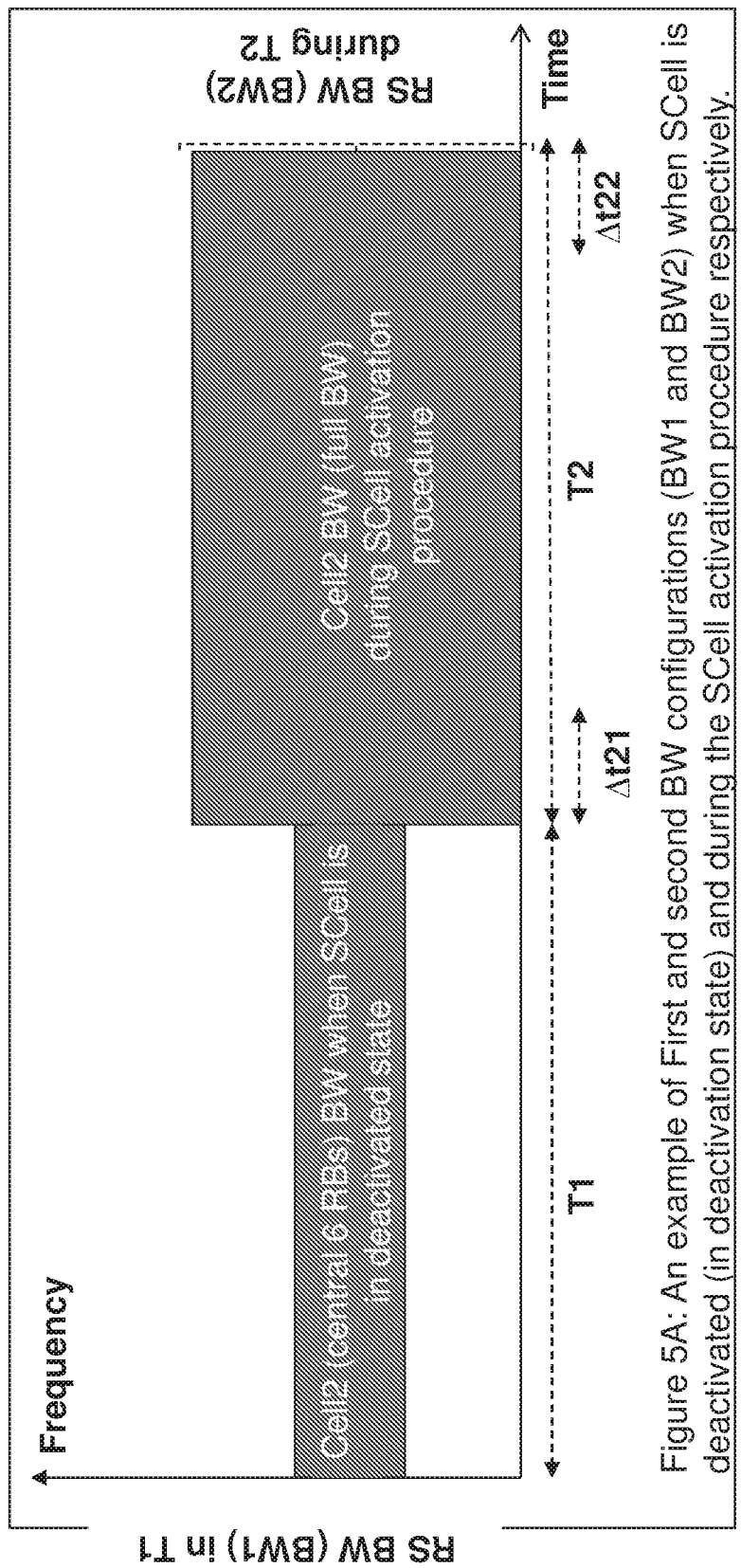
FIGS. 5a-5b illustrate transmissions of RS over different bandwidths (BW)

For example if cell2 is deactivated in T1, i.e. in deactivated state, and but it shall be activated by the wireless device 10 during T2 then during T2 BW2=Bm e.g. BW1=Bm=50 RBs. This is shown in the example in FIG. 5a.

Figure 5B:
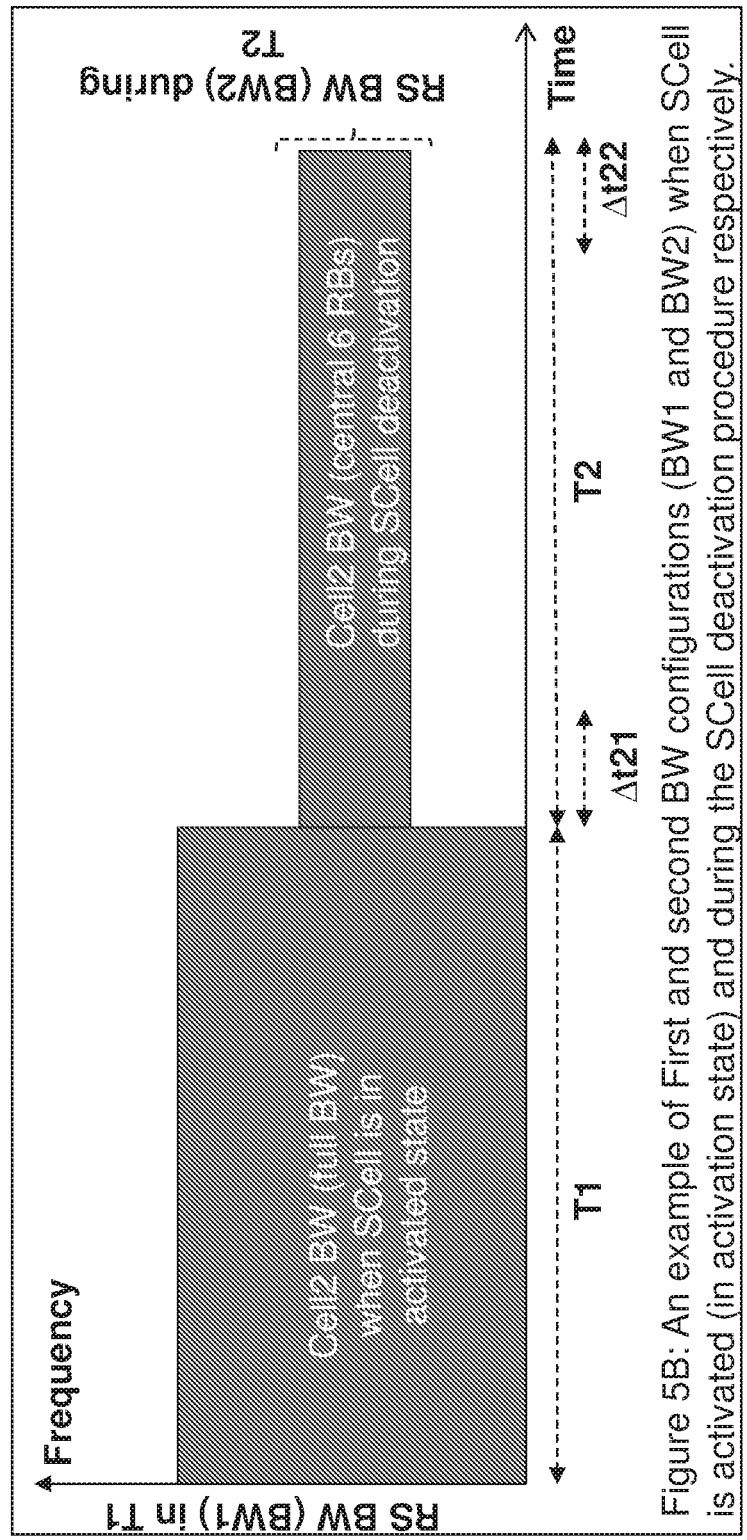

But if cell2 is activated in T1, i.e. in activated state, and it shall be deactivated during T2 then during T2, BW1<Bm e.g. BW2=6 RBs while Bm=50 RBs. This is shown in the example in FIG. 5b.

The explanation for the above examples stem from the fact that in order to activate cell2, e.g. during SCell activation, or added, e.g. during PSCell addition, the wireless device 10 may track timing of cell2 and synchronize to cell2. During the activation procedure the wireless device 10 has to further estimate or derive a channel state indicator (CSI) measurement, e.g. CQI, over RS transmitted by cell2. If cell2 is successfully activated then the wireless device 10 sends a valid CSI measurement, e.g. CQI with non-zero CQI index, to the network node within the time period T2'. The CSI measurement results testify that the wireless device 10 has successfully activated cell2. Otherwise the radio network node assumes that the wireless device 10 has failed to activate cell2. That's why the wireless device 10 may be required to receive RS from cell2 over full BW when cell2 is activated. On the other hand when SCell is deactivated then the wireless device 10 is not required to do any synchronization to cell2, and nor it has to do any measurement on cell2. Therefore during deactivation time the wireless device 10 can afford to receive RS over reduced BW e.g. over 6 central RBs within cell2 BW.

Action 405 (optional): The wireless device 10 may select RS type used during the setting up or releasing procedure depending on the BW configuration, e.g., selecting CRS for AGC and/or CQI report if CRS BW is above a threshold or full bandwidth, otherwise selecting another RS type.

FIG. 4b is a flowchart depicting a method performed by the second radio network node 13, but may be performed by the first radio network node in case the first radio network node 12 serves the secondary cell 14, for handling communication of the wireless device 10 in the wireless communication network 1. The actions do not have to be taken in the order stated below, but may be taken in any suitable order. Actions performed in some embodiments are marked with dashed boxes.

Action 411 (in some embodiments): The first radio network node 12 receives an indication, e.g. capability information, of the ability of the wireless device 10 to operate according to one or more embodiments described herein, e.g. capable to assume, upon reception of the command, that RS is transmitted over the second bandwidth, being e.g. during activation of the secondary serving cell, the wider bandwidth.

Action 412 The second radio network node 13, or just the radio network node 13 transmits one or more reference signals in the secondary cell (cell2) using the first bandwidth configuration (BW1) during the first time period (T1), e.g. narrower bandwidth.

Action 413 The radio network node 13 obtains data indicating the state transition e.g. receives a command from the first radio network node 12 or the first radio network node 12 may receive signal measurements from the wireless device. The radio network node then determines that secondary cell, cell2, is expected to be setup or released as a secondary serving cell of the wireless device 10 starting from a reference time (Tr) where Tr occurs after the end of T1.

the wireless device 10 may be at least one active wireless device in the cell;

the wireless device 10 may be at least one active wireless device in the cell which indicated the corresponding capability (Action 411)

Action 414: The radio network node 13 transmits the RS(s) in the secondary cell, cell2, using the second bandwidth configuration (BW2) during the second period (T2), where T2 starts at least T21 before Tr and ends no later than T22 after the completion of the setup or release procedure, and where BW1 and BW2 are different.

It should be noted that the first radio network node 12 may indicate BW2 to one or more wireless devices or wireless devices from which it received the corresponding capability (action 411), prior to performing action 414.

In order to ensure the above wireless device and radio network node behavior rules can be pre-defined in the specification, which the wireless device 10 and the radio network node should comply. Examples of such specific rules, i.e. required periods are exemplified below, are:

If the wireless device 10 is configured with DRX cycle then the wireless device 10 may activate a deactivated SCell within a specified time, e.g. 24 ms, provided that the cell specific-reference signal (CRS) of an SCell being activated are available over the entire bandwidth of the SCell starting from the reception of the SCell activation command at the wireless device 10 and until at least N1 number of subframes after the wireless device 10 has activated the SCell. Examples of N1 are 1 or 2 subframes.

If the wireless device 10 is configured with DRX cycle then wireless device 10 may deactivate an activated SCell within a specified time (e.g. 8 ms) even if the cell specific-reference signal (CRS) of an SCell being deactivated are available over the central 6 resource blocks within the bandwidth of the SCell starting from the reception of the SCell deactivation command at the wireless device 10 and until at least N2 number of subframes after the wireless device 10 has deactivated the SCell. Examples of N2 are 1 or 2 subframes.

If the wireless device 10 capable of dual connectivity is configured with DRX cycle in SCG then the wireless device 10 may add a PSCell in the SCG within a specified time (e.g. 150 ms) provided that the CRS of an PSCell being added are available over the entire bandwidth of the PSCell starting from the reception of the PSCell addition message at the wireless device 10 and until at least N3 number of subframes after the wireless device 10 has added the PSCell. Examples of N3 are 1 or 2 subframes.

If the wireless device 10 capable of dual connectivity is configured with DRX cycle in SCG then the wireless device 10 may release a PSCell in the SCG within the specified time (e.g. 20 ms) even if the cell specific-reference signal (CRS) of an PSCell being released are available over the central 6 resource blocks within the bandwidth of the of the PSCell starting from the reception of the PSCell release message at the wireless device 10 and until at least N4 number of subframes after the wireless device 10 has released the PSCell. Examples of N1 are 1 or 2 subframes.

Figure 6:
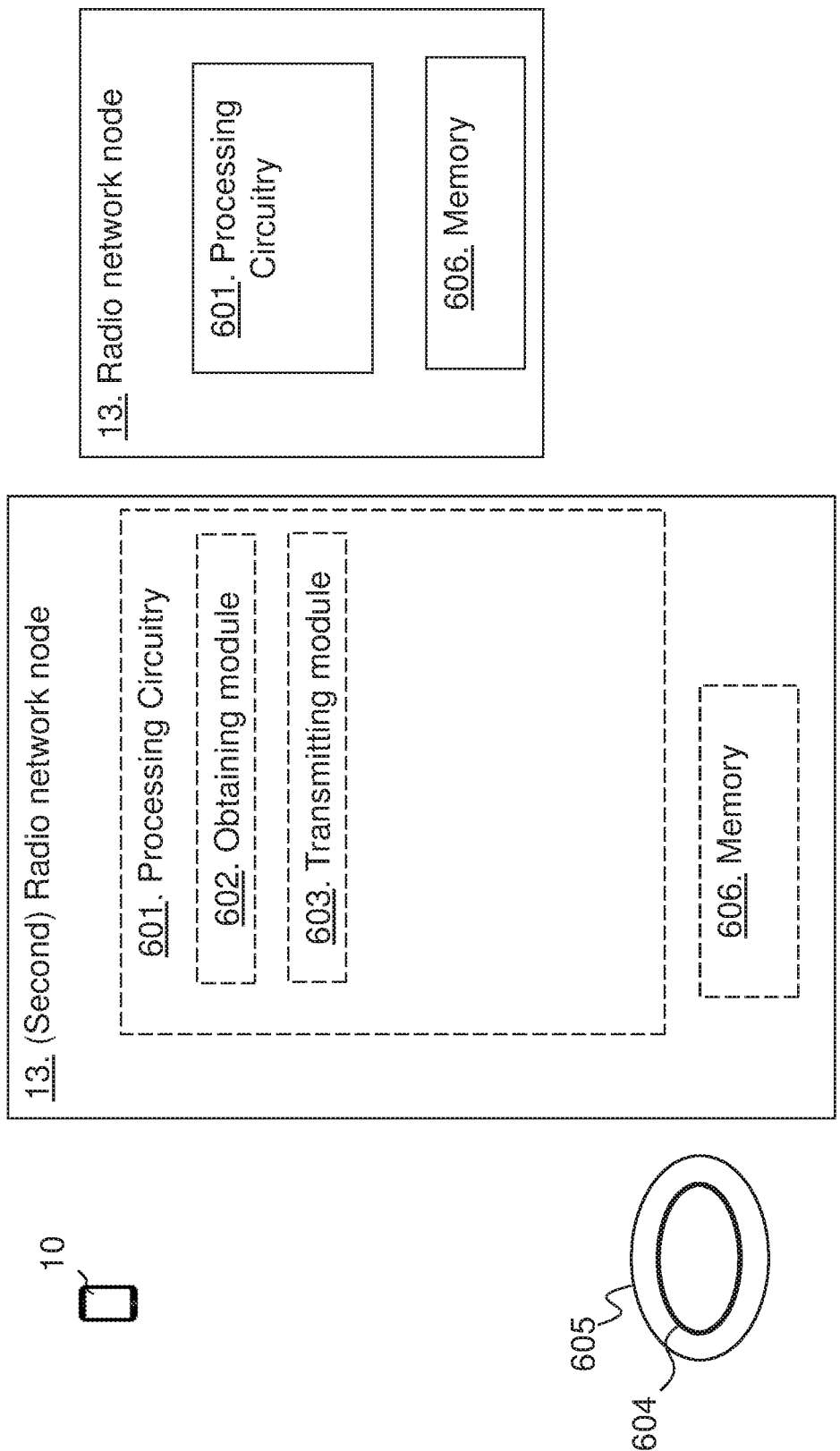
FIG. 6 is a block diagram depicting a radio network node according to embodiments herein.

FIG. 6 is a block diagram depicting the radio network node e.g. (second) radio network node 13, in two embodiments, for handling communication of the wireless device 10 in a multicarrier operation in the wireless communication network 1. The radio network node is configured to provide the secondary serving cell for the wireless device 10, wherein the wireless device 10 is configured with a DRX cycle and is served by the first serving cell and also served, or expected to be served, by the secondary serving cell, wherein the secondary serving cell is provided on a lean carrier wherein reference signals are transmitted with a bandwidth that is variable between the first bandwidth and the second bandwidth, wherein the second bandwidth is narrower than the first bandwidth. Thus, the radio network node 13 may provide radio coverage over the secondary cell transmitting reference signals over the first bandwidth. The wireless device 10 may be served by a first serving cell provided by the second radio network node 13 or the first radio network node 12. The wireless device 10 may be served by the secondary cell as a secondary serving cell. The wireless device 10 is served by SCell (i.e. secondary serving cell on SCC) even when SCell is deactivated i.e. SCell is the serving cell regardless of whether it is activated or deactivated. But wireless device 10 can only be scheduled on SCell when the SCell is activated.

The radio network node may comprise processing circuitry 601, e.g. one or more processors, configured to perform the methods herein.

The radio network node may comprise an obtaining module 602. The radio network node, the processing circuitry 601, and/or the obtaining module 602 is configured to obtain the indication indicating the state transition of the secondary serving cell for the wireless device 10. E.g. the radio network node, the processing circuitry 601, and/or the obtaining module 602 may be configured to obtain data, which data, e.g. command from the first serving radio network node 12, indicates the state transition of the secondary serving cell for the wireless device 10. E.g. the command may order deactivation/activation the secondary cell as a secondary serving cell for the wireless device. The indication may be the secondary cell setup command received from another radio network node; or measurements of the wireless device 10 received by the radio network node on the first serving cell.

The radio network node may comprise a transmitting module 603, e.g. a transmitter, a transceiver or similar. The radio network node 13, the processing circuitry 601, and/or the transmitting module 603 is configured to transmit, on the secondary serving cell, one or more reference signals over the second bandwidth. The radio network node, the processing circuitry 601, and/or the transmitting module 603 is configured to upon obtaining the indication, transmit, on the secondary serving cell, one or more reference signals over the first bandwidth. The radio network node, the processing circuitry 601, and/or the transmitting module 603 may further, in response to the obtained indication being a measurement of the wireless device 10 received by the radio network node, be configured to transmit the secondary cell setup command to the wireless device 10. E.g. the indication may thus trigger a transmission, to the wireless device 10 on the first serving cell, of the secondary cell setup command for the secondary serving cell, which secondary cell setup command indicates the state transition of the secondary serving cell for the wireless device 10.

The radio network node, the processing circuitry 601, and/or the transmitting module 603 is configured to, upon obtaining the data, triggering transmission (directly, immediately) of one or more reference signals over the second bandwidth, which second bandwidth is different than the first bandwidth.

The radio network node, the processing circuitry 601, and/or the obtaining module 602 may further be configured to obtain another or further indication indicating a further state transition of the secondary serving cell for the wireless device 10. The other or further indication may be a secondary cell release command received from another radio network node or the other or further indication may be measurements of the wireless device 10 received by the radio network node on the first serving cell. The other or further indication may in this latter case trigger a transmission, to the wireless device 10 on the first serving cell, of a secondary cell release command for the secondary serving cell. The secondary cell release command indicates the further state transition of the secondary serving cell for the wireless device. The radio network node, the processing circuitry 601, and/or the transmitting module 603 may be configured to, upon obtaining the other indication, transmit on the secondary serving cell, one or more reference signals over the second bandwidth.

The methods according to the embodiments described herein for the radio network node are respectively implemented by means of e.g. a computer program product 604 or a computer program, comprising instructions, i.e., software code portions, which, when executed on at least one processor, cause the at least one processor to carry out the actions described herein, as performed by the radio network node 13. The computer program product 604 may be stored on a computer-readable storage medium 605, e.g. a disc, universal serial bus (USB) stick, or similar. The computer-readable storage medium 605, having stored thereon the computer program product, may comprise the instructions which, when executed on at least one processor, cause the at least one processor to carry out the actions described herein, as performed by the radio network node 13. In some embodiments, the computer-readable storage medium may be a non-transitory computer-readable storage medium.

The radio network node 13 may further comprise a memory 606. The memory comprises one or more units to be used to store data on, such as bandwidth configurations, measurements, serving cells, wireless device information, applications to perform the methods disclosed herein when being executed, and similar. Thus, the radio network node may comprise the processing circuitry and the memory, said memory comprising instructions executable by said processing circuitry whereby said radio network node is operative to perform the methods herein.

Figure 7:
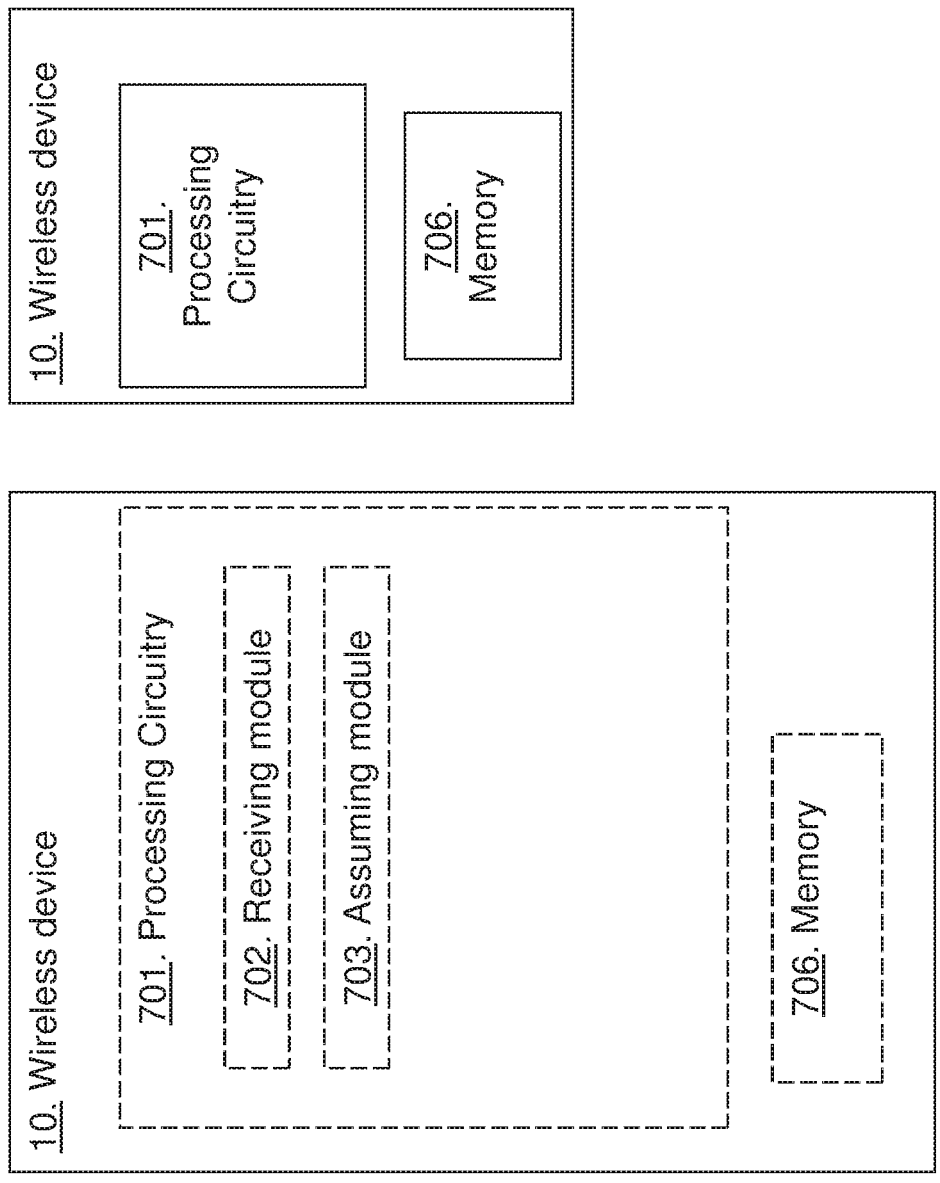
FIG. 7 is a block diagram depicting a wireless device according to embodiments herein.
Figure 7:
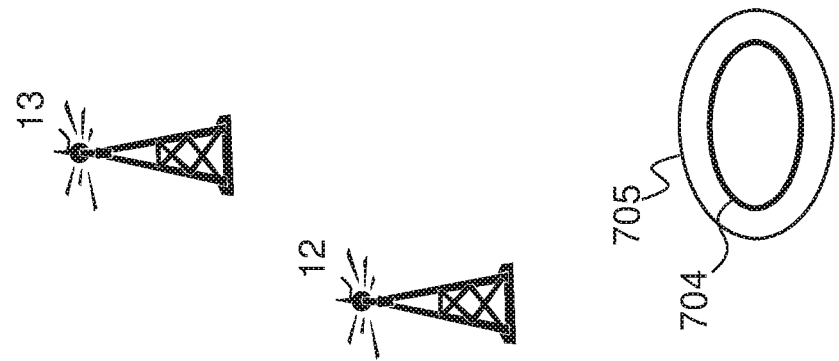

FIG. 7 is a block diagram depicting, in two embodiments, the wireless device 10 according to embodiments herein for handling communication of the wireless device 10 in a multicarrier operation in the wireless communication network 1. The wireless device 10 is configured with a discontinuous reception cycle and is served by the first serving cell and also served, or expected to be served, by the secondary serving cell. The secondary serving cell is provided on a lean carrier wherein reference signals are transmitted with a bandwidth that is variable between a first bandwidth and a second bandwidth. The second bandwidth is narrower than the first bandwidth. The second bandwidth may comprise six resource blocks and the first bandwidth may be larger than the second bandwidth by a threshold, e.g. it may comprise or span at least one resource block more than the second bandwidth. The one or more reference signals may be cell specific reference signals.

The wireless device 10 may comprise processing circuitry 701, e.g. one or more processors, configured to perform the methods herein.

The wireless device 10 may comprise a receiving module 702, e.g. a receiver or transceiver. The wireless device 10, the processing circuitry 701, and/or the receiving module 702 is configured to receive, on the secondary serving cell, one or more reference signals assumed by the wireless device 10 to have been transmitted on the secondary serving cell over the second bandwidth. The wireless device 10, the processing circuitry 701, and/or the receiving module 702 is further configured to receive on the first serving cell, a secondary cell setup command for the secondary serving cell, which secondary cell setup command indicates a state transition of the secondary serving cell for the wireless device 10. E.g. receive the command from the serving radio network node 12 or the radio network node (in case one radio network node serves both cells), which command indicates the state transition of the secondary serving cell for the wireless device. The wireless device 10, the processing circuitry 701, and/or the receiving module 702 may further be configured to, upon reception of the secondary cell setup command receive, on the secondary serving cell, the one or more reference signals assumed by the wireless device 10 to have been transmitted, on the secondary serving cell over the first bandwidth. The state transition may be a configuration, an addition, or an activation of the secondary serving cell.

The wireless device 10 may comprise an assuming module 703. The wireless device 10, the processing circuitry 701, and/or the assuming module 703 is configured to, upon reception of the secondary cell setup command assume that the one or more reference signals received on the secondary serving cell are transmitted, by the radio network node providing the secondary serving cell over the first bandwidth. The wireless device 10, the processing circuitry 701, and/or the assuming module 703 may be configured to assume, during a time period required to perform a secondary cell setup procedure, that the one or more reference signals received on the secondary serving cell are transmitted, by the radio network node providing the secondary serving cell, over the first bandwidth. E.g. upon reception of the command, to assume the transmission, from the radio network node, of one or more reference signals over the first bandwidth, which second bandwidth is different than the first bandwidth. Thus, the wireless device 10 may adapt reception for transmission of the RS over the second bandwidth.

The wireless device 10, the processing circuitry 701, and/or the receiving module 702 may further be configured to receive, on the first serving cell, a secondary cell release command for the secondary serving cell, which secondary cell release command indicates a further state transition of the secondary serving cell for the wireless device. The wireless device 10, the processing circuitry 701, and/or the receiving module 702 may be configured to, upon reception of the secondary cell release command, receive on the secondary serving cell, one or more reference signals assumed by the wireless device 10 to have been transmitted on the secondary serving cell over the second bandwidth. The wireless device 10, the processing circuitry 701, and/or the receiving module 702 may be configured to assume, during a time period when the wireless device performs a secondary cell release procedure, that the one or more reference signals received on the secondary serving cell are transmitted, by the radio network node providing the secondary serving cell, over the second bandwidth.

The methods according to the embodiments described herein for the wireless device 10 are respectively implemented by means of e.g. a computer program product 704 or a computer program, comprising instructions, i.e., software code portions, which, when executed on at least one processor, cause the at least one processor to carry out the actions described herein, as performed by the wireless device 10. The computer program product 704 may be stored on a computer-readable storage medium 705, e.g. a disc, an USB stick, or similar. The computer-readable storage medium 705, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 may further comprise a memory 706. The memory comprises one or more units to be used to store data on, such as BW information, serving cells, applications to perform the methods disclosed herein when being executed, and similar. Thus, the wireless device 10 may comprise the processing circuitry and the memory, said memory comprising instructions executable by said processing circuitry whereby said wireless device is operative to perform the methods herein.

It is herein provided a method performed by a radio network node for handling communication of a wireless device in a multicarrier operation in a wireless communication network. The wireless device may be served by a first serving cell and a secondary serving cell, which secondary serving cell is provided by the radio network node and in which secondary serving cell the radio network node transmits reference signals over a first bandwidth. The radio network node obtains data, which data, e.g. command from a first serving radio network node, indicates a state transition of the secondary serving cell for the wireless device, e.g. deactivating/activating the secondary serving cell for the wireless device. The obtaining of the data triggers the radio network node to transmit one or more reference signals over a second bandwidth, which second bandwidth is different than the first bandwidth.

It is further herein provided a method performed by a wireless device for handling communication of the wireless device in a multicarrier operation in a wireless communication network. The wireless device may be served by a first serving cell and a secondary serving cell, which secondary serving cell is provided by a radio network node and in which secondary serving cell the radio network node transmits reference signals, such as CRS, over a first bandwidth. The wireless device receives a command from a serving radio network node or the radio network node, which command indicates a state transition of the secondary serving cell for the wireless device, e.g. deactivating/activating the secondary serving cell for the wireless device. Upon reception of the command the wireless device assumes a transmission, from the radio network node, of one or more reference signals over a second bandwidth, which second bandwidth is different than the first bandwidth.

According to yet another aspect the object is achieved by providing a radio network node and a wireless device configured to perform the methods herein.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/ or program or application data, and non-volatile memory. Other hardware, conventional and/or custom, may also be included. Designers of radio network nodes will appreciate the cost, performance, and maintenance trade-offs inherent in these design choices.

Any two or more embodiments described in this document may be combined in any way with each other. Furthermore, even though the examples herein are given in the Licensed Assisted Access (LAA) context, the embodiments described herein are not limited to LAA and can also apply in a more general case when the wireless device may need to configure measurement period adaptively to one or more conditions, e.g., channel quality, Ês/Iot, Signal to Interference pule Noise ratio (SINR), received signal quality, total interference or interference on a specific resources or from a specific interferer(s), etc. Other non-limiting examples where the described herein methods are particularly beneficial include measurement s for Discontinuous Reception (DRX) or extended DRX, and measurement s in high speed train environments.

In some embodiments a non-limiting term "wireless device" is used. The wireless device herein can be any type of UE capable of communicating with network node or another UE over radio signals. The wireless device may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise of a radio network node such as base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU) Remote Radio Head (RRH), a core network node (e.g., Mobility Managing Entity (MME), Self-Organizing Network (SON) node, a coordinating node, positioning node, Minimizing Drive Test (MDT) node, etc.), or even an external node (e.g., $3^{rd}$ party node, a node external to the current network), etc.

The term "radio node" used herein may be used to denote the wireless device or the radio network node.

The embodiments are applicable to single carrier as well as to multicarrier or carrier aggregation (CA) operation of the wireless device 10 in which the wireless device 10 is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The term "signaling" used herein may comprise any of: high-layer signaling, e.g., via Radio Resource Control (RRC), lower-layer signaling, e.g., via a physical control channel or a broadcast channel, or a combination thereof. The signaling may be implicit or explicit. The signaling may further be unicast, multicast or broadcast. The signaling may also be directly to another node or via a third node.

The term time resource used herein may correspond to any type of physical resource or radio resource expressed in terms of length of time. Examples of time resources are: symbol, time slot, subframe, radio frame, Transmission Time Interval (TTI), interleaving time, hyper System Frame Number (H-SFN), etc.

In some embodiments, the term "RS" is used, which most frequently refers to CRS but in principle may also refer to other RS types or physical signals.

In some embodiments a term bandwidth (BW) is used. Over the BW the radio network node 13 transmits to and/or receives signal from one or more wireless devices in a cell. The bandwidth is interchangeably called as operating BW, channel bandwidth, system bandwidth, transmission bandwidth, cell bandwidth, cell transmission BW, carrier bandwidth, measurement bandwidth, maximum allowed measurement bandwidth, common bandwidth of plurality of cells on a carrier etc. The BW may also correspond to BW of specific signals (e.g. BW of any of: Sounding reference signal (SRS), CRS, Demodulation Reference Signal (DMRS), Discovery Reference Signal, synchronization signal, data channel, control channel etc). The BW may be expressed in different units. Examples of units are KHz, MHz, number of resource blocks, number of resource elements, number of subcarriers, number of physical channels, number of frequency resource units etc. The frequency channel or carrier frequency over which a RAT operates is enumerated or addressed by a channel number aka absolute radio frequency channel number (ARFCN) e.g. E-UTRA ARFCN (EARFCN) in LTE etc. In case, a signal is transmitted in a number of discontinuous in frequency RBs, the term bandwidth may also comprise the total span of all RBs of the signal.

The embodiments described herein may apply to any RAT or their evolution, e.g., LTE Frequency Duplex Division (FDD), LTE Time Duplex Division (TDD), LTE with frame structure 3 or unlicensed operation, UTRA, GSM, WiFi, short-range communication RAT, narrow band RAT, RAT for 5G, etc.

The terms "setup" or "release" procedure may refer e.g. to any procedure described above.

Figure 8A:
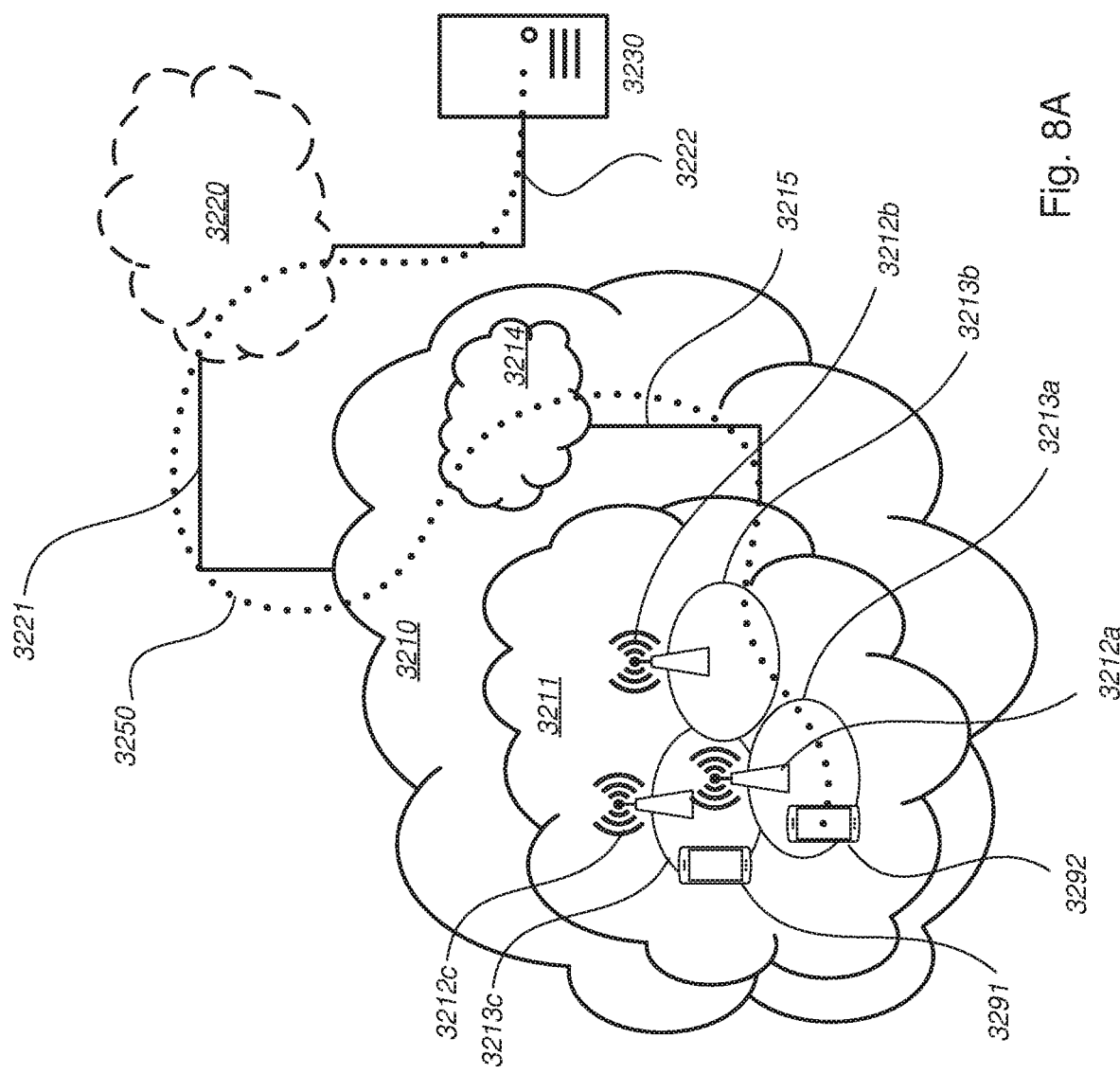
FIG. 8A schematically illustrates a telecommunication network connected via an intermediate network to a host computer.

With reference to FIG. 8A, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8A as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8B. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8B) served by the base station 3320. The communication interface 3326 may be configured to facilitate a connection 3360 to the host computer 3310. The connection 3360 may be direct or it may pass through a core network (not shown in FIG. 8B) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8B:
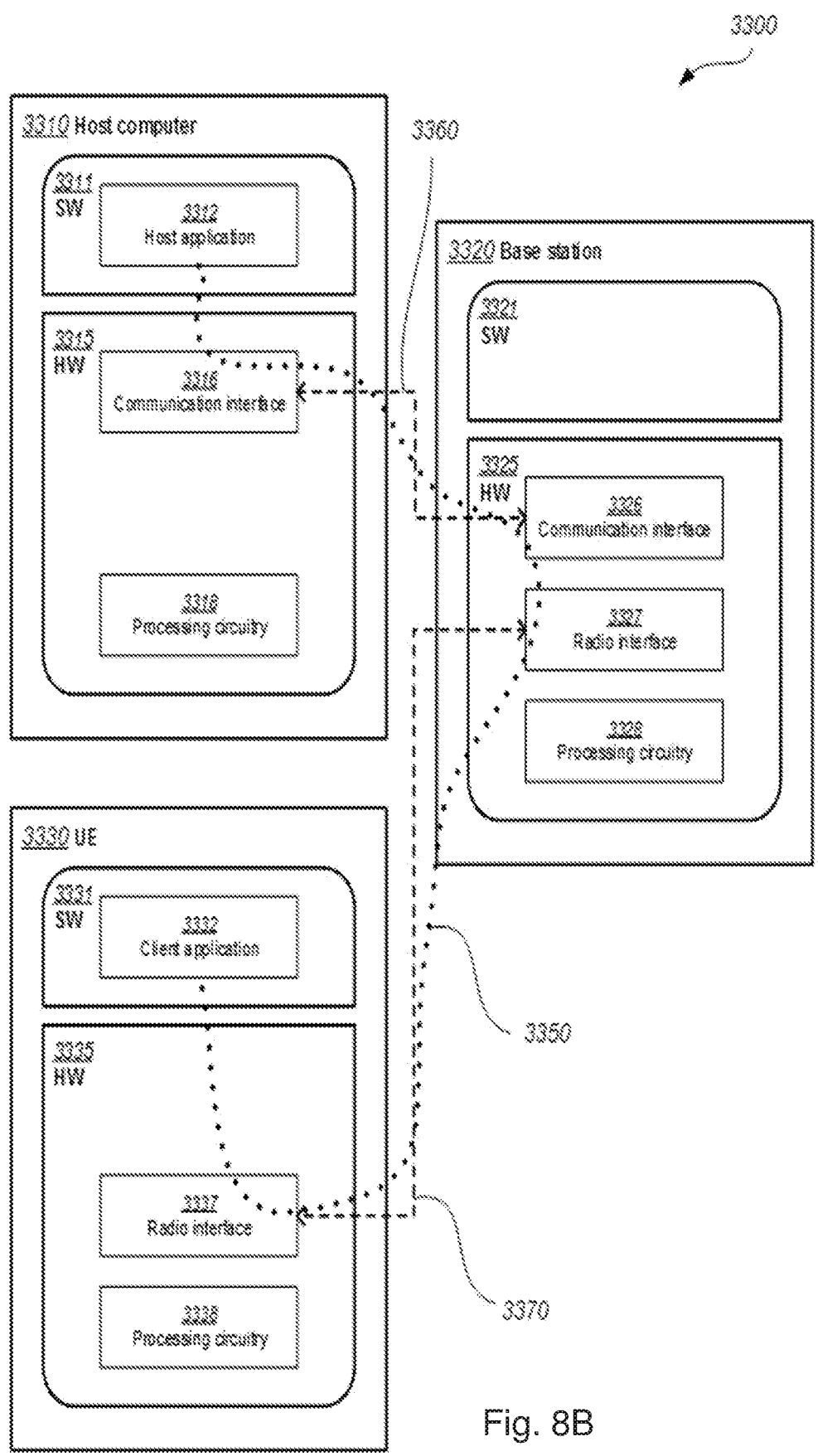
FIG. 8B is a generalized block diagram of a host computer communicating via a base station with a user equipment over a partially wireless connection.

It is noted that the host computer 3310, base station 3320 and UE 3330 illustrated in FIG. 8B may be identical to the host computer 3230, one of the base stations 3212a, 3212b, 3212c and one of the UEs 3291, 3292 of FIG. 8A, respectively. This is to say, the inner workings of these entities may be as shown in FIG. 8B and independently, the surrounding network topology may be that of FIG. 8A.

In FIG. 8B, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve usage of resources since failure of activation, configuration and addition of the secondary serving cell is reduced and that may affect the latency and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 9, 10:
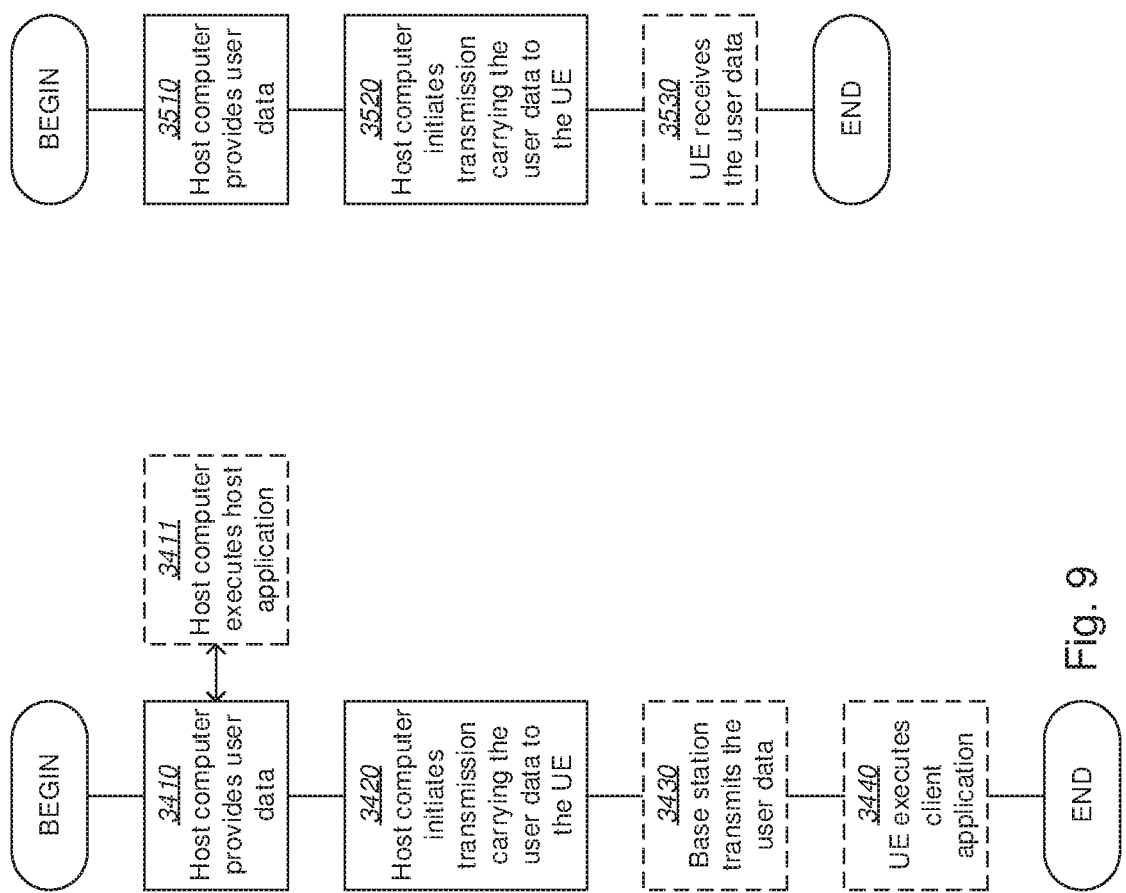

FIG. 9 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step

3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication of the wireless device in a multicarrier operation in a wireless communication network, wherein the wireless device is configured with a discontinuous reception cycle and is served by a first serving cell and also served, or expected to be served, by a secondary serving cell, wherein the secondary serving cell is provided on a lean carrier wherein reference signals are transmitted with a bandwidth that is variable between a first bandwidth and a second bandwidth, wherein the second bandwidth is narrower than the first bandwidth, the method comprising:
  receiving on the secondary serving cell, one or more reference signals assumed by the wireless device to have been transmitted on the secondary serving cell over the second bandwidth;
  receiving a secondary cell setup command for the secondary serving cell; and,
  upon reception of the secondary cell setup command, receiving, on the secondary serving cell, one or more reference signals assumed by the wireless device to have been transmitted on the secondary serving cell over the first bandwidth.

2. The method of claim 1, wherein upon reception of the secondary cell setup command, the wireless device assumes, during a time period required to perform a secondary cell setup procedure, the one or more reference signals to have been transmitted on the secondary serving cell over the first bandwidth.

3. The method of claim 1, wherein the one or more reference signals are cell specific reference signals.

4. The method of claim 1, wherein the second bandwidth comprises six resource blocks and the first bandwidth is larger than the second bandwidth by a threshold.

5. The method of claim 1, wherein the secondary cell setup command indicates a state transition of the secondary serving cell for the wireless device and wherein the state transition is a configuration, an addition, or an activation of the secondary serving cell.

6. The method of claim 1, further comprising
  receiving a secondary cell release command for the secondary serving cell; and,
  upon reception of the secondary cell release command, receiving, on the secondary serving cell, one or more reference signals assumed by the wireless device to have been transmitted on the secondary serving cell over the second bandwidth.

7. The method of claim 6, wherein, upon reception of the secondary cell release command, the wireless device assumes, during a time period when the wireless device performs a secondary cell release procedure, the one or more reference signals to have been transmitted on the secondary serving cell over the second bandwidth.

8. A method performed by a radio network node for handling communication of a wireless device in a multicarrier operation in a wireless communication network, wherein the radio network node is configured to provide a secondary serving cell for the wireless device, wherein the wireless device is configured with a discontinuous reception cycle and is served by a first serving cell and also served, or expected to be served, by the secondary serving cell, wherein the secondary serving cell is provided on a lean carrier wherein reference signals are transmitted with a bandwidth that is variable between a first bandwidth and a second bandwidth, wherein the second bandwidth is narrower than the first bandwidth, the method comprising:
  transmitting on the secondary serving cell, one or more reference signals over the second bandwidth;
  obtaining an indication indicating a state transition of the secondary serving cell for the wireless device; and,
  upon obtaining the indication, transmitting, on the secondary serving cell, one or more reference signals over the first bandwidth.

9. The method of claim 8, wherein the obtained indication is a secondary cell setup command received from another radio network node or measurements of the wireless device received by the radio network node on the first cell.

10. The method of claim 8, wherein the obtained indication is a measurement of the wireless device that triggers a transmission, to the wireless device on the first serving cell, of a secondary cell setup command for the secondary serving cell, which secondary cell setup command indicates the state transition of the secondary serving cell for the wireless device.

11. The method of claim 8, further comprising
  obtaining a further indication indicating a further state transition of the secondary serving cell for the wireless device; and,
  upon obtaining the further indication, transmitting, on the secondary serving cell, one or more reference signals over the second bandwidth.

12. A wireless device for handling communication of the wireless device in a multicarrier operation in a wireless communication network, wherein the wireless device is configured with a discontinuous reception cycle and configured to be served by a first serving cell and also configured to be served, or expected to be served, by a secondary serving cell, wherein the secondary serving cell is provided on a lean carrier wherein reference signals are transmitted with a bandwidth that is variable between a first bandwidth and a second bandwidth, wherein the second bandwidth is narrower than the first bandwidth, wherein the wireless device comprises:
  radio circuitry;
  processing circuitry operably coupled to the radio circuitry; and
  memory circuitry operably coupled to the radio circuitry and comprising program instructions for execution by the processing circuitry, whereby the wireless device is configured to:
    receive, on the secondary serving cell, one or more reference signals assumed by the wireless device to have been transmitted on the secondary serving cell over the second bandwidth;
    receive a secondary cell setup command for the secondary serving cell; and,
    upon reception of the secondary cell setup command, to receive, on the secondary serving cell, one or more reference signals assumed by the wireless device to have been transmitted on the secondary serving cell over the first bandwidth.

13. The wireless device of claim 12, further configured to assume, during a time period required to perform a secondary cell setup procedure, the one or more reference signals to have been transmitted on the secondary serving cell over the first bandwidth.

14. The wireless device of claim 12, wherein the one or more reference signals are cell specific reference signals.

15. The wireless device of claim 12, wherein the second bandwidth comprises six resource blocks and the first bandwidth is larger than the second bandwidth by a threshold.

16. The wireless device of claim 12, wherein the secondary cell setup command indicates a state transition of the secondary serving cell for the wireless device and wherein the state transition is a configuration, an addition, or an activation of the secondary serving cell.

17. The wireless device of claim 12, wherein the wireless device is further configured to:
receive a secondary cell release command for the secondary serving cell; and,
upon reception of the secondary cell release command, to receive on the secondary serving cell, one or more reference signals assumed by the wireless device to have been transmitted on the secondary serving cell over the second bandwidth.

18. The wireless device of claim 17, wherein the wireless device is further configured to assume, during a time period when the wireless device performs a secondary cell release procedure, the one or more reference signals to have been transmitted on the secondary serving cell over the second bandwidth.

19. A radio network node for handling communication of a wireless device in a multicarrier operation in a wireless communication network, wherein the radio network node is configured to provide a secondary serving cell for the wireless device, wherein the wireless device is configured with a discontinuous reception cycle and is served by a first serving cell and also served, or expected to be served, by the secondary serving cell, wherein the secondary serving cell is provided on a lean carrier wherein reference signals are transmitted with a bandwidth that is variable between a first bandwidth and a second bandwidth, wherein the second bandwidth is narrower than the first bandwidth, wherein the radio network node comprises:
radio circuitry;
processing circuitry operably coupled to the radio circuitry; and
memory circuitry operably coupled to the radio circuitry and comprising program instructions for execution by the processing circuitry, whereby the wireless device is configured to:
transmit, on the secondary serving cell, one or more reference signals over the second bandwidth;
obtain an indication indicating a state transition of the secondary serving cell for the wireless device; and
upon obtaining the indication, transmit, on the secondary serving cell, one or more reference signals over the first bandwidth.

20. The radio network node of claim 19, wherein the indication is a secondary cell setup command received from another radio network node or measurements of the wireless device received by the radio network node on the first cell.

21. The radio network node of claim 19, wherein the radio network node upon the obtained indication being a measurement of the wireless device, is configured to trigger a transmission, to the wireless device on the first serving cell, of a secondary cell setup command for the secondary serving cell, which secondary cell setup command indicates the state transition of the secondary serving cell for the wireless device.

22. The radio network node of claim 19, wherein the radio network node is further configured to
obtain a further indication indicating a further state transition of the secondary serving cell for the wireless device; and,
upon obtaining the further indication, transmit, on the secondary serving cell, one or more reference signals over the second bandwidth.

* * * * *